US007860839B2

(12) United States Patent
Cisler et al.

(10) Patent No.: US 7,860,839 B2
(45) Date of Patent: *Dec. 28, 2010

(54) APPLICATION-BASED BACKUP-RESTORE OF ELECTRONIC INFORMATION

(75) Inventors: Pavel Cisler, Los Gatos, CA (US); Dave Lyons, San Jose, CA (US); Kevin Tiene, Cupertino, CA (US); Mike Matas, Palo Alto, CA (US); Gregory N. Christie, San Jose, CA (US); Scott Forstall, Mountain View, CA (US); Marcel Mwa van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 11/499,250

(22) Filed: Aug. 4, 2006

(65) Prior Publication Data

US 2008/0034039 A1    Feb. 7, 2008

(51) Int. Cl.
*G06F 17/30* (2006.01)
(52) U.S. Cl. ...................................... 707/654; 715/229
(58) Field of Classification Search ................. 707/100, 707/654; 714/7; 715/700, 229
See application file for complete search history.

(56) References Cited

U.S. PATENT DOCUMENTS

| 5,150,473 | A | 9/1992 | Zulch |
| 5,163,148 | A | 11/1992 | Walls |
| 5,276,867 | A | 1/1994 | Kenley et al. |
| 5,680,562 | A | 10/1997 | Conrad et al. |
| 5,745,669 | A | 4/1998 | Hugard et al. |
| 5,758,359 | A | 5/1998 | Saxon |

(Continued)

FOREIGN PATENT DOCUMENTS

EP         0629950         12/1994

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner*—James Trujillo
*Assistant Examiner*—Amresh Singh
(74) *Attorney, Agent, or Firm*—Fish & Richardson P.C.

(57) ABSTRACT

Systems and methods for storing and restoring backup data. One method includes receiving, while a current view of an application is displayed in a user interface, a first user input requesting a history view associated with the current view of the application. The history view is displayed in response to the first user input, the history view including at least a first visual representation of an earlier version of the current view of the application, the earlier version including a first element. A second user input is received while the history view is displayed. The second user input requesting that the current view of the application be modified according to the earlier version, at least with regard to the first element. The current view of the application is modified in response to the second user input according to the earlier version, at least with regard to the first element.

39 Claims, 16 Drawing Sheets

U.S. PATENT DOCUMENTS

| | | | |
|---|---|---|---|
| 5,790,120 A * | 8/1998 | Lozares et al. | 715/779 |
| 5,818,936 A | 10/1998 | Mashayekhi | |
| 5,819,292 A | 10/1998 | Hitz et al. | |
| 5,831,617 A | 11/1998 | Bhukhanwala | |
| 5,832,526 A * | 11/1998 | Schuyler | 1/1 |
| 5,961,605 A | 10/1999 | Deng et al. | |
| 5,987,566 A | 11/1999 | Vishlitzky et al. | |
| 6,023,506 A | 2/2000 | Ote et al. | |
| 6,097,313 A | 8/2000 | Takahashi et al. | |
| 6,112,318 A | 8/2000 | Jouppi et al. | |
| 6,167,532 A | 12/2000 | Wisecup | |
| 6,188,405 B1 | 2/2001 | Czerwinski et al. | |
| 0,047,368 A1 | 11/2001 | Oshinsky et al. | |
| 6,366,988 B1 | 4/2002 | Skiba et al. | |
| 6,396,500 B1 | 5/2002 | Qureshi et al. | |
| 6,397,308 B1 | 5/2002 | Ofek et al. | |
| 6,424,626 B1 | 7/2002 | Kidambi et al. | |
| 6,460,055 B1 | 10/2002 | Midgley et al. | |
| 6,625,704 B2 | 9/2003 | Winokur | |
| 6,711,572 B2 | 3/2004 | Zakharov et al. | |
| 6,714,201 B1 | 3/2004 | Grinstein et al. | |
| 6,785,751 B1 | 8/2004 | Connor | |
| 6,785,786 B1 | 8/2004 | Gold et al. | |
| 6,857,001 B2 | 2/2005 | Hitz et al. | |
| 6,892,211 B2 | 5/2005 | Hitz et al. | |
| 6,901,493 B1 | 5/2005 | Maffezzoni | |
| 6,918,124 B1 | 7/2005 | Novik et al. | |
| 6,948,039 B2 | 9/2005 | Biessener et al. | |
| 6,959,368 B1 | 10/2005 | St. Pierre et al. | |
| 7,072,916 B1 | 7/2006 | Lewis et al. | |
| 7,103,740 B1 | 9/2006 | Colgrove et al. | |
| 7,111,136 B2 | 9/2006 | Yamagami | |
| 7,155,486 B2 | 12/2006 | Aoshima et al. | |
| 7,174,352 B2 | 2/2007 | Kleiman et al. | |
| 7,185,028 B2 | 2/2007 | Lechner | |
| 7,200,617 B2 | 4/2007 | Kibuse | |
| 7,222,194 B2 | 5/2007 | Kano et al. | |
| 7,318,134 B1 | 1/2008 | Oliveira et al. | |
| 7,418,619 B1 | 8/2008 | Uhlmann et al. | |
| 7,440,125 B2 | 10/2008 | Maekawa et al. | |
| 7,518,611 B2 | 4/2009 | Boyd et al. | |
| 7,630,021 B2 | 12/2009 | Matsuzaka et al. | |
| 7,669,141 B1 | 2/2010 | Pegg | |
| 7,676,689 B1 | 3/2010 | Shioyama et al. | |
| 2002/0023198 A1 | 2/2002 | Kokubun et al. | |
| 2002/0054158 A1 | 5/2002 | Asami | |
| 2002/0063737 A1 | 5/2002 | Feig et al. | |
| 2002/0160760 A1 | 10/2002 | Aoyama | |
| 2002/0174283 A1 | 11/2002 | Lin | |
| 2003/0063128 A1 | 4/2003 | Salmimaa et al. | |
| 2003/0126247 A1 | 7/2003 | Strasser et al. | |
| 2003/0131007 A1 * | 7/2003 | Schirmer et al. | 707/100 |
| 2003/0135650 A1 | 7/2003 | Kano et al. | |
| 2003/0137540 A1 | 7/2003 | Klevenz et al. | |
| 2003/0172937 A1 | 9/2003 | Faries et al. | |
| 2003/0220949 A1 | 11/2003 | Witt et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0133575 A1 | 7/2004 | Farmer et al. | |
| 2004/0139396 A1 | 7/2004 | Gelernter et al. | |
| 2004/0167942 A1 | 8/2004 | Oshinsky et al. | |
| 2004/0193953 A1 | 9/2004 | Callahan et al. | |
| 2004/0210608 A1 | 10/2004 | Lee et al. | |
| 2004/0220980 A1 | 11/2004 | Forster | |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |
| 2005/0071390 A1 | 3/2005 | Midgley et al. | |
| 2005/0091596 A1 | 4/2005 | Anthony et al. | |
| 2005/0102695 A1 | 5/2005 | Musser | |
| 2005/0144135 A1 | 6/2005 | Juarez et al. | |
| 2005/0149577 A1 | 7/2005 | Okada et al. | |
| 2005/0165867 A1 | 7/2005 | Barton et al. | |
| 2005/0187992 A1 | 8/2005 | Prahlad et al. | |
| 2005/0204186 A1 * | 9/2005 | Rothman et al. | 714/7 |
| 2005/0216527 A1 | 9/2005 | Erlingsson | |
| 2005/0246398 A1 | 11/2005 | Barzilai et al. | |
| 2005/0262168 A1 | 11/2005 | Helliker et al. | |
| 2005/0262377 A1 | 11/2005 | Sim-Tang | |
| 2006/0026218 A1 | 2/2006 | Urmston | |
| 2006/0053332 A1 | 3/2006 | Uhlmann | |
| 2006/0064444 A1 | 3/2006 | Van Ingen et al. | |
| 2006/0085792 A1 | 4/2006 | Traut | |
| 2006/0085817 A1 | 4/2006 | Kim et al. | |
| 2006/0101384 A1 * | 5/2006 | Sim-Tang et al. | 717/104 |
| 2006/0106893 A1 | 5/2006 | Daniels et al. | |
| 2006/0117309 A1 | 6/2006 | Singhal et al. | |
| 2006/0137010 A1 | 6/2006 | Kramer et al. | |
| 2006/0143250 A1 | 6/2006 | Peterson et al. | |
| 2006/0161861 A1 | 7/2006 | Holecek et al. | |
| 2006/0218363 A1 | 9/2006 | Palapudi | |
| 2006/0248294 A1 | 11/2006 | Nedved et al. | |
| 2007/0027935 A1 | 2/2007 | Haselton et al. | |
| 2007/0030528 A1 | 2/2007 | Quaeler et al. | |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0136389 A1 | 6/2007 | Bergant et al. | |
| 2007/0156772 A1 | 7/2007 | Lechner | |
| 2007/0168497 A1 | 7/2007 | Locker et al. | |
| 2007/0185922 A1 | 8/2007 | Kapoor et al. | |
| 2007/0192386 A1 | 8/2007 | Fries et al. | |
| 2007/0266007 A1 | 11/2007 | Arrouye et al. | |
| 2007/0271303 A1 | 11/2007 | Menendez et al. | |
| 2007/0288536 A1 | 12/2007 | Sen et al. | |
| 2008/0016576 A1 | 1/2008 | Ueda et al. | |
| 2008/0028007 A1 | 1/2008 | Ishii et al. | |
| 2008/0033922 A1 | 2/2008 | Cisler et al. | |
| 2008/0034004 A1 | 2/2008 | Cisler et al. | |
| 2008/0034011 A1 | 2/2008 | Cisler et al. | |
| 2008/0034013 A1 | 2/2008 | Cisler et al. | |
| 2008/0034017 A1 | 2/2008 | Giampaolo et al. | |
| 2008/0034018 A1 | 2/2008 | Cisler et al. | |
| 2008/0034019 A1 | 2/2008 | Cisler et al. | |
| 2008/0034039 A1 | 2/2008 | Cisler et al. | |
| 2008/0059894 A1 | 3/2008 | Cisler et al. | |
| 2008/0077808 A1 | 3/2008 | Teicher et al. | |
| 2008/0091655 A1 | 4/2008 | Gokhale et al. | |
| 2008/0126441 A1 | 5/2008 | Giampaolo et al. | |
| 2008/0126442 A1 | 5/2008 | Cisler et al. | |
| 2008/0141029 A1 | 6/2008 | Culver | |
| 2008/0177961 A1 | 7/2008 | McSharry et al. | |
| 2008/0229037 A1 | 9/2008 | Bunte et al. | |
| 2008/0285754 A1 | 11/2008 | Kezmann | |
| 2010/0017855 A1 | 1/2010 | Johnson et al. | |

FOREIGN PATENT DOCUMENTS

| | | |
|---|---|---|
| EP | 1152352 | 11/2001 |
| EP | 1582982 | 10/2005 |
| WO | 01/06356 | 1/2001 |
| WO | 02/101540 | 12/2002 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet:<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

Academic Resource Center, http://www.academicresourcecenter.net/curriculum/glossary.aspx.

International Search Report and Written Opinion, PCT/US2008/066212, Mar. 9, 2009, 26 pages.

International Search Report and Written Opinion, PCT/US2007/074863 Apr. 21, 2009, 20 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"StorageSync: Backup, Restore, & Synchronization Software User's Guide", SimpleTech, 2003, 100 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html; 11 pages.

* cited by examiner

APPLICATION-BASED BACKUP-RESTORE OF ELECTRONIC INFORMATION

RELATED APPLICATIONS

This application is generally related to the following jointly owned and co-pending patent applications, each incorporated herein by reference in its entirety:

U.S. patent application Ser. No. 11/499,839, for "Managing Backup of Content," filed Aug. 4, 2006;

U.S. patent application Ser. No. 11/499,881, for "User Interface for Backup Management," filed Aug. 4, 2006;

U.S. patent application Ser. No. 11/499,879, for "Navigation of Electronic Backups," filed Aug. 4, 2006;

U.S. patent application Ser. No. 11/499,880, for "Architecture for Back Up and/or Recovery of Electronic Data," filed Aug. 4, 2006;

U.S. patent application Ser. No. 11/499,385, for "Searching a Backup Archive," filed Aug. 4, 2006;

U.S. patent application Ser. No. 11/499,885, for "Conflict Resolution in Recovery of Electronic Data," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,256, for "Consistent Backup of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user may have had second thoughts about the revisions, or may have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods are provided for storing and restoring backup data. The backup data can relate to previous state of particular applications. The previous states of the applications can be presented in a backup interface. In one implementation, a user can enter the backup interface from the application window (e.g., iTunes). Views presented in the backup interface can represent past states of the application (e.g., state of the iTunes library).

In general, in one aspect, a method is provided. The method includes receiving, while a current view of an application is displayed in a user interface, a first user input requesting that a history view associated with the current view of the application be displayed. The history view is displayed in response to the first user input, the history view including at least a first visual representation of an earlier version of the current view of the application, the earlier version including a first element. A second user input is received while the history view is displayed. The second user input requesting that the current view of the application be modified according to the earlier version, at least with regard to the first element. The current view of the application is modified in response to the second user input according to the earlier version, at least with regard to the first element.

Implementations of the method can include one or more of the following features. The first user input requesting the history view can be initiated in the current view of the application. The second user input can request that the modification be limited to the first element, and wherein the modification modifies the current view of the application to include the first element and does not otherwise modify the current view of the application.

The first element can be a particular set of application data that is not stored as typical file data. The set of application data can include mail messages, address book entries, or audio data. The first visual representation can be included in a timeline presented in the history view, the timeline including several visual representations of earlier versions of the current view of the application. The earlier versions of the current view of the application can be obtained at times defined by a schedule or by a rule. The earlier versions of the current view of the application can be obtained at times when at least one predefined event occurred.

The history view can further include an input control for modifying the timeline to include only at least one of the visual representations whose corresponding earlier version differs from the current view of the application. The history view can further include a rollover function providing that the timeline is displayed when a user-controlled cursor is located over the timeline, and that the timeline is not displayed when the user-controlled cursor is not located over the timeline. The application can be an audio application and the first element can be a playlist. The application can be an e-mail application and the first element can be an inbox. The application can be an e-mail application and the first element can be a calendar.

The application can be an address book application and the first element can be a directory of contacts. The application can be a messaging application and the first element can be a buddy list.

In general, in one aspect, a computer program product is provided. The computer program product includes instructions to generate on a display device a user interface. The user interface includes a view display area for presenting a current view of an application. The user interface also includes a history view display area for presenting a history view associated with the current view of the application, the history view including at least a first visual representation of an earlier version of the current view of the application and an input control for initiating a restoration of the current view of the application according to at least a portion of the earlier version.

Implementations can include one or more of the following features. The earlier version can include at least a first element that a user can select, and wherein initiation of the input control after the selection initiates the restoration of the current view of the application according to only the first element of the earlier version. The first visual representation can be included in a timeline presented in the history view, the timeline including several visual representations of earlier versions of the current view of the application. The history view can further include another input control for modifying the timeline to include only at least one of the visual representations whose corresponding earlier version differs from the current view of the application.

In general, in one aspect, a method is provided. The method includes defining one or more criteria for capturing a state of a view of a user interface of an application. The state of the view is captured in accordance with the criteria. A prompt is received to suspend presentation of a current view and present a captured view. The captured view is reinstated into the current view of the user interface. Defining the one or more criteria can include receiving a user input in the user interface of the application setting one or more parameters associated with the one or more criteria.

In general, in one aspect, a method is provided. The method includes receiving, while a current view of a system settings interface is displayed in a user interface, a first user input requesting that a history view associated with the current view of the system settings interface be displayed. The history view is displayed in response to the first user input, the history view including at least a first visual representation of an earlier version of the current view of the system setting interface, the earlier version including one or more preferences. A second user input is received while the history view is displayed. The second user input requests that the current view of the system settings interface be modified according to the earlier version, at least with regard to a first preference of the one or more preferences. The current view of the system settings interface are modified in response to the second user input according to the earlier version, at least with regard to the first preference.

Implementations can include one or more of the following features. The system settings interface can be an input device settings interface and the one or more preferences are keyboard and mouse settings. The system settings interface can be a user interface settings interface and the one or more preferences are user interface preferences.

The details of the various aspects of the subject matter described in this specification are set forth in the accompanying drawings and the description below. Other features, aspects, and advantages of the invention will become apparent from the description, the drawings, and the claims.

BRIEF DESCRIPTION FO THE DRAWINGS

DETAILED DESCRIPTION

Figure 1:
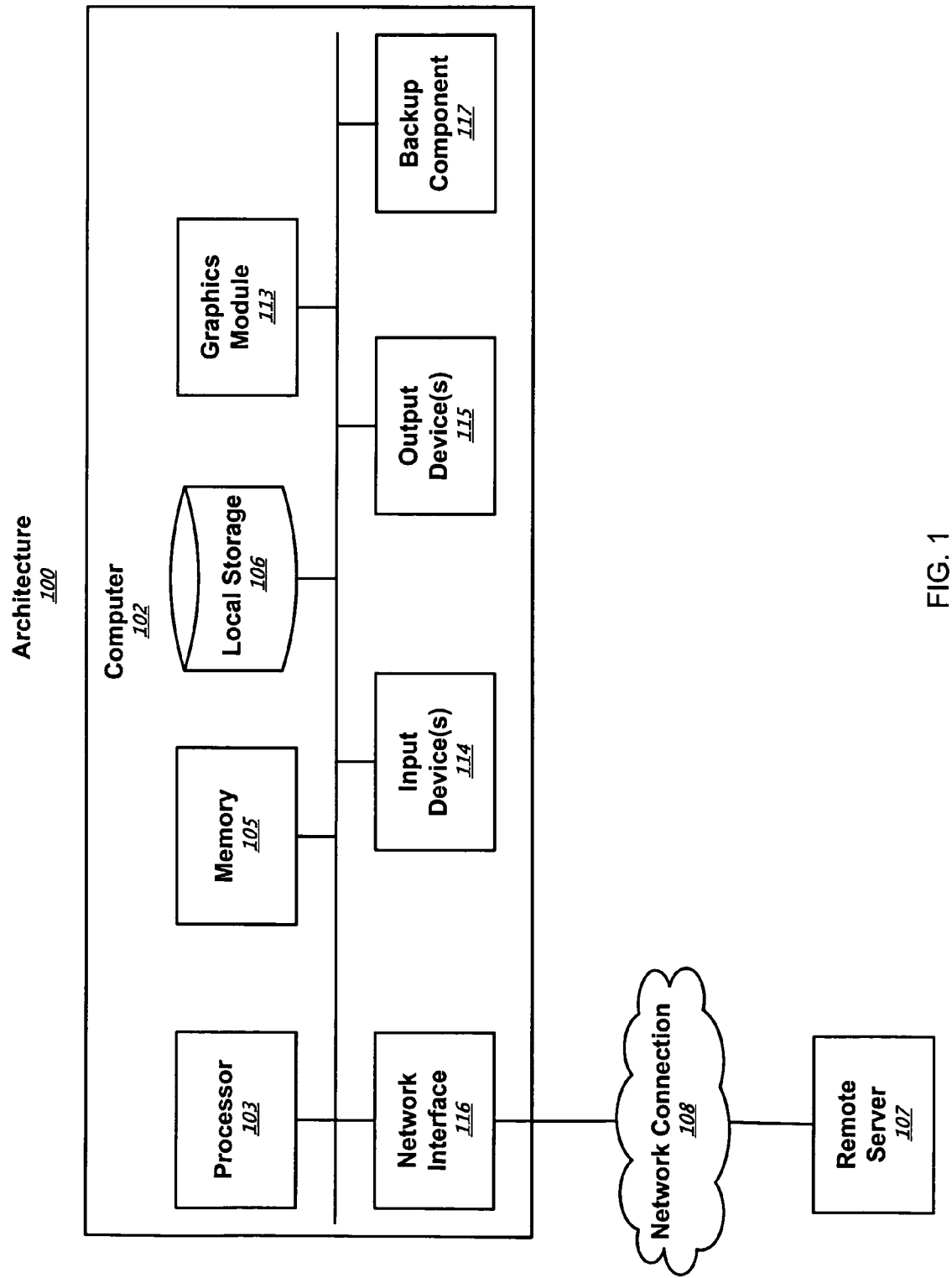
FIG. 1 is a block diagram of an example of an architecture for modifying a user interface view in a display environment.

FIG. 1 is a block diagram of an architecture 100 for capturing at least one earlier version of a user interface view and allowing a user to initiate a restoration based on it. As used herein, a view refers to an item, element, or other content, capable of being stored and/or retrieved in an interface, that can be subjected to a backup operation by a backup component 117. For example, a user interface view can contain any number of icons, files, folders, application state information and/or machine state information, preferences, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). The systems and methods can be stand alone, or otherwise integrated into a more comprehensive application. In the materials presented below, an integrated system and method for modifying a user interface view is disclosed. However, one of ordinary skill in the art will recognize that the engines, methods, processes and the like that are described can themselves be an individual process or application, part of an operating system, a plug-in, an application or the like.

In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items, for example within the local storage 106 or in an external storage repository. In one implementation, the backup component 117 also allows a user to select any of the stored versions and use it to initiate a restoration of that version in the computer.

Figure 2:
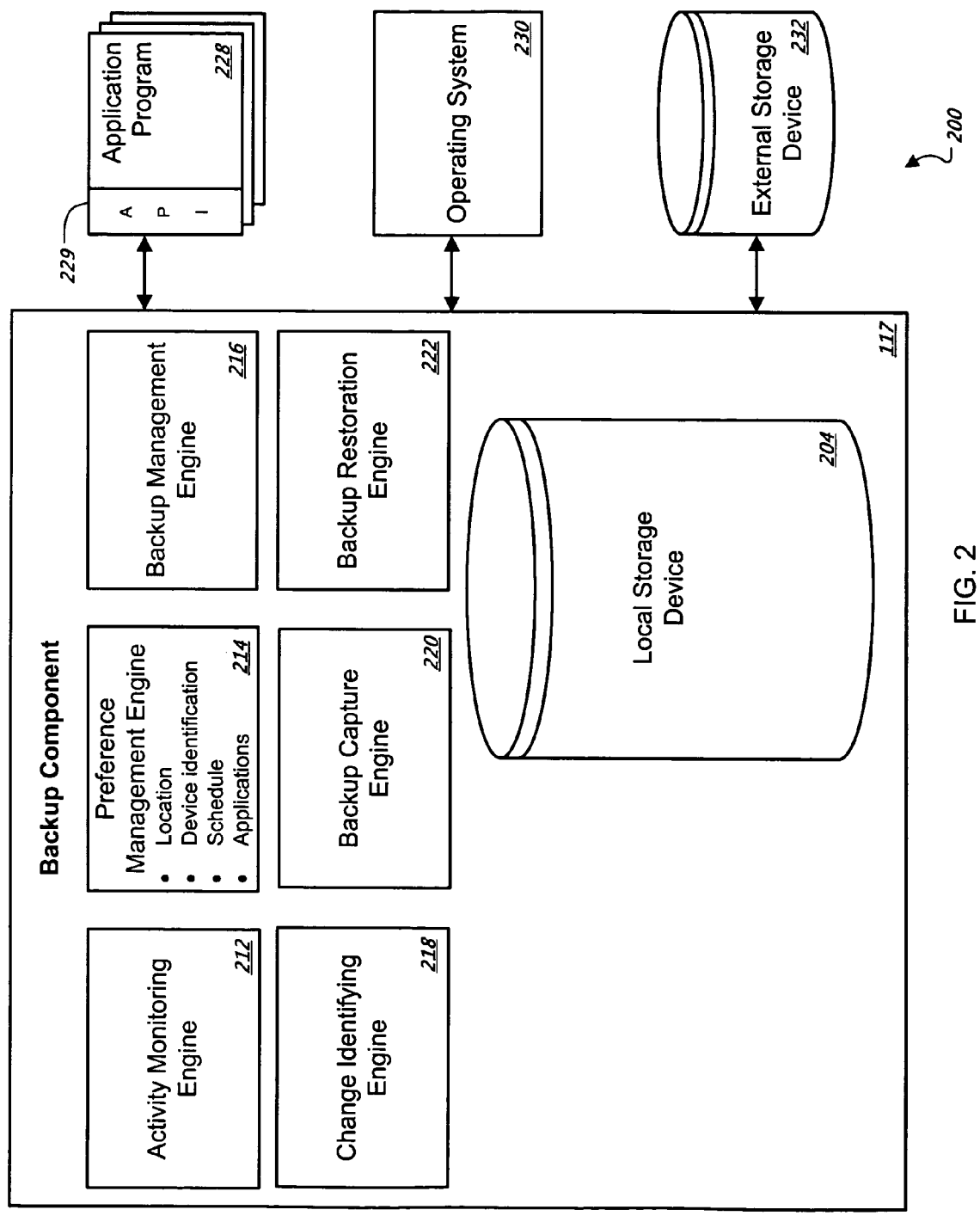
FIG. 2 is a block diagram of an example of an architecture for backing up and restoring application files.

FIG. 2 is a block diagram of an exemplary architecture (e.g., software architecture) 200 for enabling the back up and restoration of application files, such as those associated with a set of application programs 228.

Each application program 228 can include an application programming interface (API) 229. The architecture 200 can utilize API 229 techniques to enhance application programs with further functionality. For example, the API 229 can link several applications together for providing a single service on all linked applications. Particularly, the time machine architecture can utilize API techniques to enhance application programs with the time machine functionality. The API tools can link several applications to the time machine engine by using an API for providing a similar menu or icon for each application. For example, the API can be used by the time machine when generating a backup version of a current state of the application. As another example, the API can be used when the application is restored, through the time machine, to a state that corresponds to a backup version. Although API 229 is shown in FIG. 2 as part of application programs 228, the API can be separate from the application programs 228. For example, the API 229 can be separately located and made available by the system for use by one or more of the application programs 228.

In one implementation, the backup component 117 provides back up and restoration capability for the system. Many different items or elements can be the subject of a backup in the system. For example, folders, files, items, information portions, directories, images, system parameters, playlists, address books, e-mails, e-mail folders, a state of an application or state of the system, preferences (e.g., user or system preferences), and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In one implementation, no local storage is provided.

The backup component 117 can interact with one or more of the applications using the corresponding API. In one implementation, this can provide backing up of that application's files, state or other items, and can provide for user restoration of a selected backed up version, to name two examples. In one implementation, the backup component 117 runs as a background task on an operating system 230 that is not visible to the user. The backup component 117 can be capable of running across multiple user accounts.

The backup component 117 includes an activity monitoring engine 212. In one implementation, the activity monitoring engine 212 monitors for changes within applications (e.g., application files or state) that are targeted for backup operations. A change can also include the addition of new files or other data structures, or deletion of existing ones.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements to be used when a backup event is eventually triggered. In one implementation, the activity monitoring engine 212 can monitor the system for periods of inactivity. The activity monitoring engine 212 can then trigger a backup event during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of a backup capture, the storage location for the backup versions, the types of elements (e.g., files or other items) that are eligible for backup capture, and the events which trigger a backup capture (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214.

A change identifying engine 218 locates specific elements (e.g., monitored files or other items within) to determine if they have changed. The change identifying engine 218 can be capable of discerning a substantive change from a non-substantive change, similar to the example described above for the activity monitoring engine 212. In one implementation, the change identifying engine 218 traverses a target set of elements (e.g., files or other items), comparing a previous version to the current version to determine whether or not a modification has occurred.

A backup capture engine 220 locates views (e.g., elements, files or other items) that are to be backed up. The backup capture engine 220 can invoke the activity monitoring engine 212 and/or the change identifying engine 218, for example, to generate a capture list. The backup capture engine 220 can then store copies of these elements in one or more targeted storage repositories. The backup capture engine 220 can track multiple version copies of each item included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored.

Figure 3:
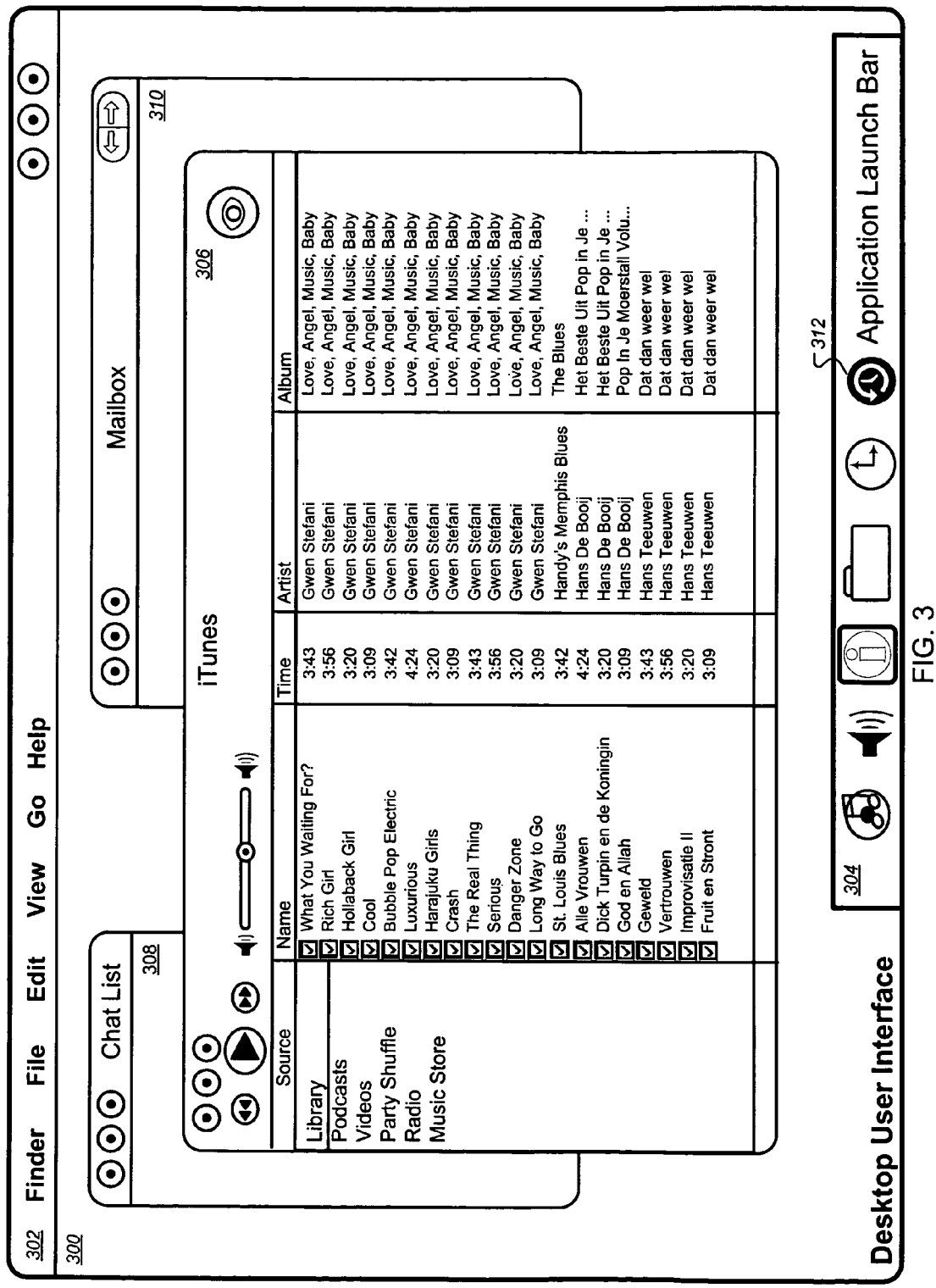
FIG. 3 is a screen shot depicting an example of a desktop user interface with multiple open applications.

FIG. 3 is a screen shot depicting an example of a user interface 300 (e.g., a desktop user interface) with multiple open applications. The user interface 300 can be a user interface as may be provided by an operating system. The user interface 300 has a background, a menu bar 302, an application launch bar 304, and may include windows, icons, and other elements. Other configurations are possible. The user interface 300 can have multiple applications running, any or all of which can be presented in a separate window. While working with the applications, or at some other time, a user can initiate a time machine session in the system.

As shown in FIG. 3 a user has launched an iTunes™ application window (available from Apple Computer in Cupertino, Calif.) which is currently presented in the foreground, and a chat application 308 and a mail application 310 that are presented in the background. In particular, the iTunes™ application is here displaying contents of the user's library, which lists the user's songs. The iTunes™ application can be used for accessing, playing and organizing media, such as digital music, pictures and video files.

The time machine application can be activated to back up or restore media content within the iTunes™ application or another application. In one implementation, the user can activate a time machine session from the user interface using a user-selectable time machine icon 312 in the application launch bar 304. As another example, the time machine session can be activated from the menu bar 102. The menu bar 302 can include a time machine options menu in addition to the activation selection. The time machine options menu can include selections allowing a user to specify data to include in a particular backup. For example, in iTunes™, the user can identify which content to back up (e.g., playlists, but not play counts, purchased songs, but not others, etc.). In addition, the user can recover songs that were previously included, but are now missing from the iTunes™ library. For example, the user can have made at least one backup of the missing songs at an earlier date, and can enter the time machine to search for the missing songs or files in a backup snapshot of the iTunes™ application allowing for the restoration of a view corresponding to that prior time. As used herein, a snapshot refers to a backup element stored in a historical archive that includes a backup of selected items or content as specified by the backup component 117. In other implementations, the user can choose to enter the time machine directly from an operating system menu. In some implementations, the time machine architecture can include several icons or menus available in other locations within the user interface 300 or running applications, thereby providing several options for activating or launching the time machine engine.

Figure 4:
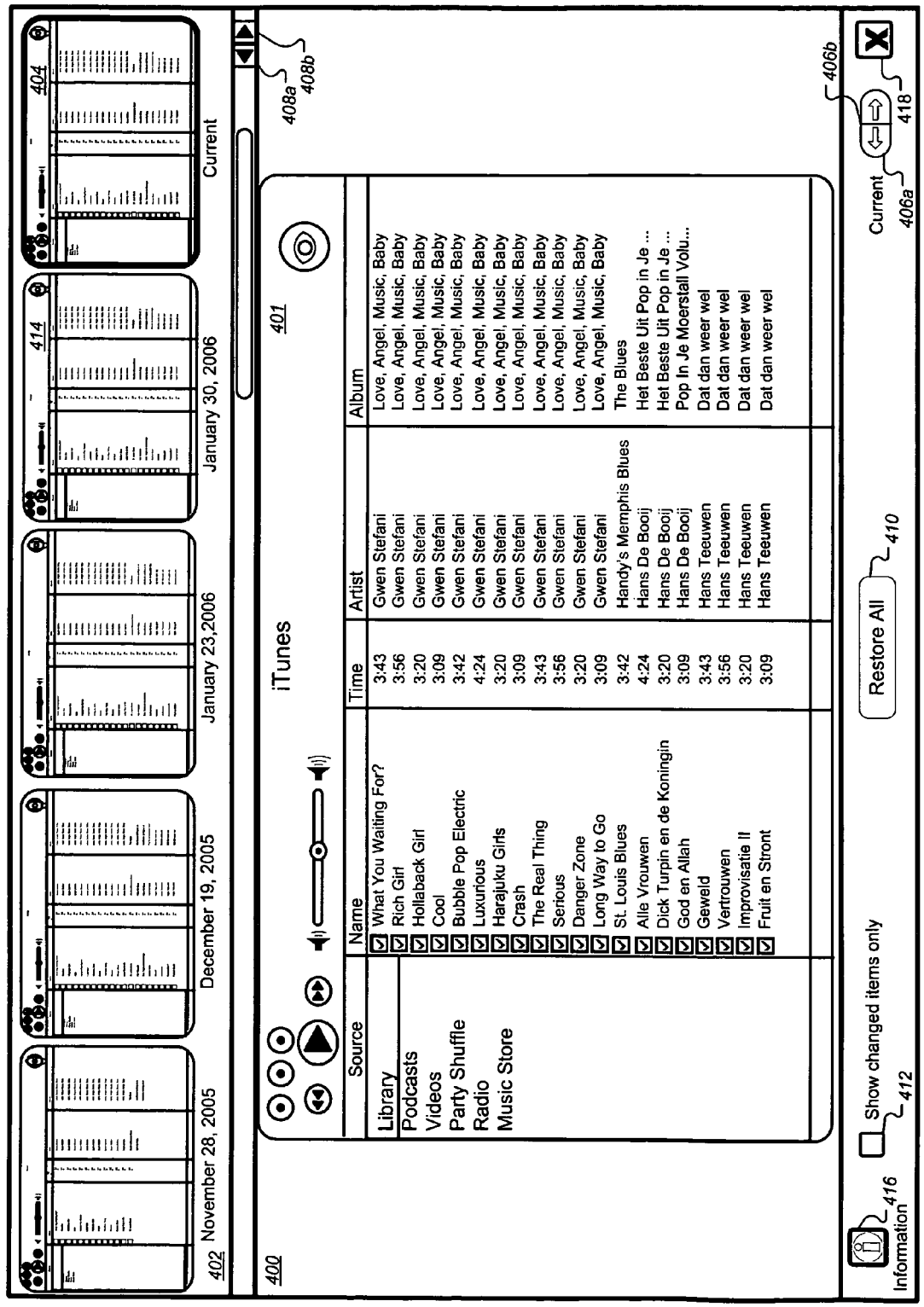
FIG. 4 is a screen shot depicting an example of an initial state for a time machine user interface after the time machine engine has been activated.

FIG. 4 is a screen shot depicting an example of an initial state for a time machine user interface 400 after the time machine engine has been activated. The time machine interface 400 here includes a presentation window 401, a timeline 402, and function buttons. As shown, the presentation window 401 is displaying the current iTunes™ application from FIG. 3 because a "current" snapshot 404 has been selected (highlighted) in the timeline. The current snapshot can be a default selection. The presentation window 401 can show the contents corresponding to the currently selected snapshot, or a portion thereof. In this particular example, there is presented a date beneath each snapshot indicating when the snapshot was taken. In some implementations, the user can select items or content within the snapshots. For example, the user can select the snapshot 404, and next select one or more songs to back up using the time machine interface 400. In addition, the same selection functionality can be used in previous snapshots, such as snapshot 414, to restore missing data to the state associated with the current snapshot 404.

The timeline 402 can include a number of snapshots representing earlier versions or states of the iTunes™ library that have been backed up. Each snapshot provides a screenshot representation of the earlier version of the iTunes™ library at a particular point in time. In some implementations, the timeline 402 includes a visual representation of backup elements, such as a miniature version of the earlier state. The time line can appear across the top portion of the time machine interface 402 (as shown). Alternatively, the timeline may not appear in the top portion of the time machine interface 400 until a user moves their cursor to (or otherwise activates) the timeline (e.g., by activating the top portion of the interface).

The time machine user interface 400 can also include function controls. For example, the interface 400 can include arrow buttons 406a and 406b to navigate the snapshots forward or backward. Arrow buttons 408a and 408b can allow the user to navigate to additional snapshots not shown in the current timeline window, thus there can be a large number of snapshots from which to select.

The interface can include a restore button 410 that, when selected, restores the view to the selected state represented by the selected snapshot. In some implementations, this terminates the session of the time machine. A user can select one element in a snapshot and then select the restore button 410 to modify the current version of the element selected (e.g., restore the state of the view). For example, in iTunes™, the user can select a few songs to restore, and this can trigger the restore button to display a more precise message, such as "restore selection only."

In one implementation, a changed items only checkbox control 412 filters the snapshots to show only those that differ from the current state. In one implementation, the checkbox control 412 does not refer to the incremental changes between snapshots in the timeline 402, but rather when invoked acts to omit those snapshots whose states are identical to the current state of the iTunes™ library from presentation in the timeline. For example, if the most recent snapshot 404 is identical to the snapshot 414 that occurs earlier in time, selecting the changed items only checkbox control 412, in one implementation, causes the time machine to cease displaying one of these versions, e.g., by removing the snapshot 414 from the timeline. This can help the user to view only snapshots that contain changes to the current version.

An information button 416 provides information regarding the selected snapshot. In one implementation, selecting the information button 416 opens a panel display. The panel display can provide information including the date and time the snapshot was made, the location of actual contents in a snapshot, the size of the snapshot, and a comment section, to name a few examples. A close button 418 can be selected to exit the time machine and return the user to the user interface 300. In some implementations, the time machine engine can automatically close upon a particular snapshot being restored. In some implementations, the user can minimize the time machine for purposes of navigating to other applications, such as an email application or a web browser.

Figure 5:
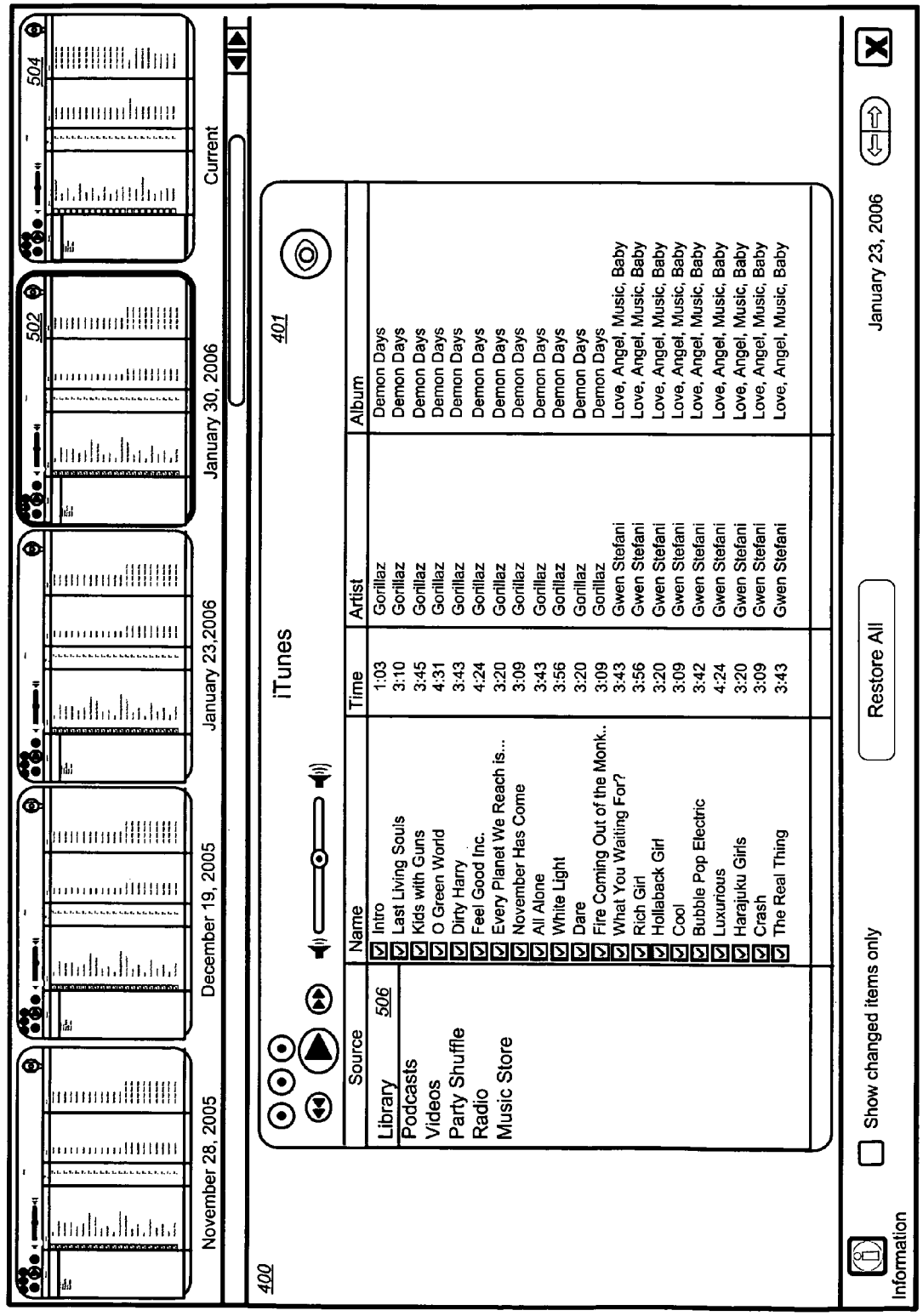
FIG. 5 is a screen shot depicting the time machine interface of FIG. 4 where a snapshot has been selected.

FIG. 5 is a screen shot depicting the time machine interface 400 where a snapshot 502 has been selected in the timeline. The iTunes™ application interface corresponding to the selected snapshot 502 (labeled Jan. 30, 2006) is displayed in the presentation window 401. This earlier version of the iTunes™ application shows a file tree where the user has selected a source library 506, which can contain several songs and albums. The songs and albums can be sorted and arranged by name, length, artist, or album title, to name a few examples. In some implementations, other sorting fields can be used, such as sorting by genre. In addition, the user can use the information in the source library 506 to create separate song lists known as playlists. Playlists can combine several artists and albums in one list and can be presented in a user-selected order. Playlists can also be burned to compact discs, transferred to an iPod™ device (available from Apple Computer in Cupertino, Calif.), or played on the computer device 102.

Figure 6:
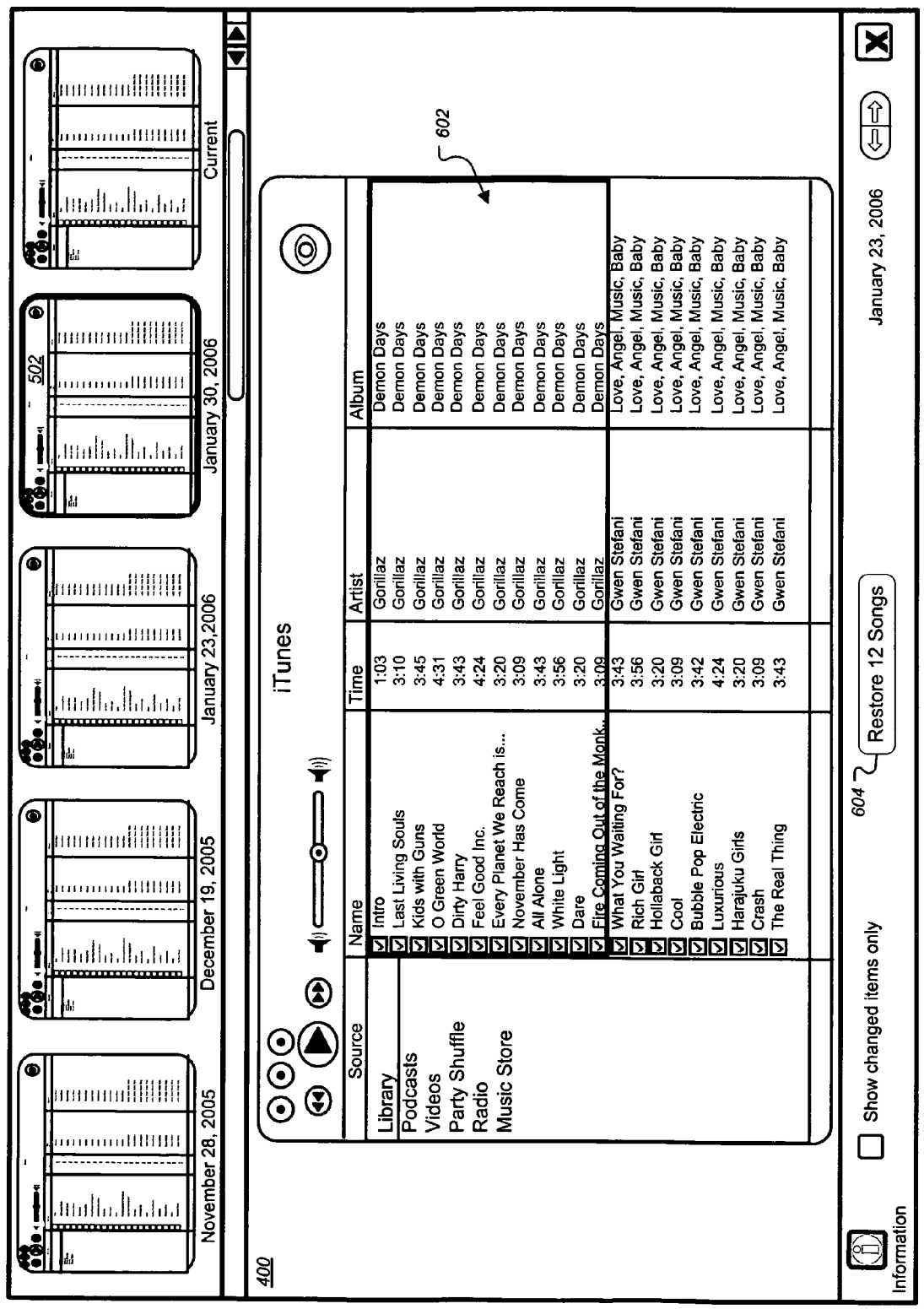
FIG. 6 is a screen shot depicting the time machine interface of FIG. 5 wherein a portion of a snapshot has been selected for restoration.

In this example, the source library displayed in the selected snapshot 502 includes songs that are not found in the current version of the library. In particular, those include twelve songs by the artist "Gorillaz." For example, the user can delete these twelve songs from the source library 506 after the earlier version was backed up. The user may wish to restore these twelve missing songs and can do so by using the time machine user interface 400. FIG. 6 illustrates one implementation of the restoration of partial content from a snapshot.

FIG. 6 is a screen shot depicting the time machine interface of FIG. 5 wherein a portion of a snapshot has been selected for restoration. For example, the user can select the twelve missing songs 602 within the snapshot 502 displayed in the presentation window. Thus, as with the earlier described implementation, the user can select items or partial content within the snapshots. Upon selecting the missing songs 602 in some implementations, the restore button can change, as shown, from "Restore All" 410 to "Restore 12 Songs" 604. If the user selects the "Restore 12 Songs" button 604, the selects songs will be restored to the library of the current iTunes™ application. Upon selecting the restore button 604, the time machine engine can exit and return the user to the user interface 300. In some implementations, the user can choose to remain in the time machine to perform further restorations.

Figure 7:
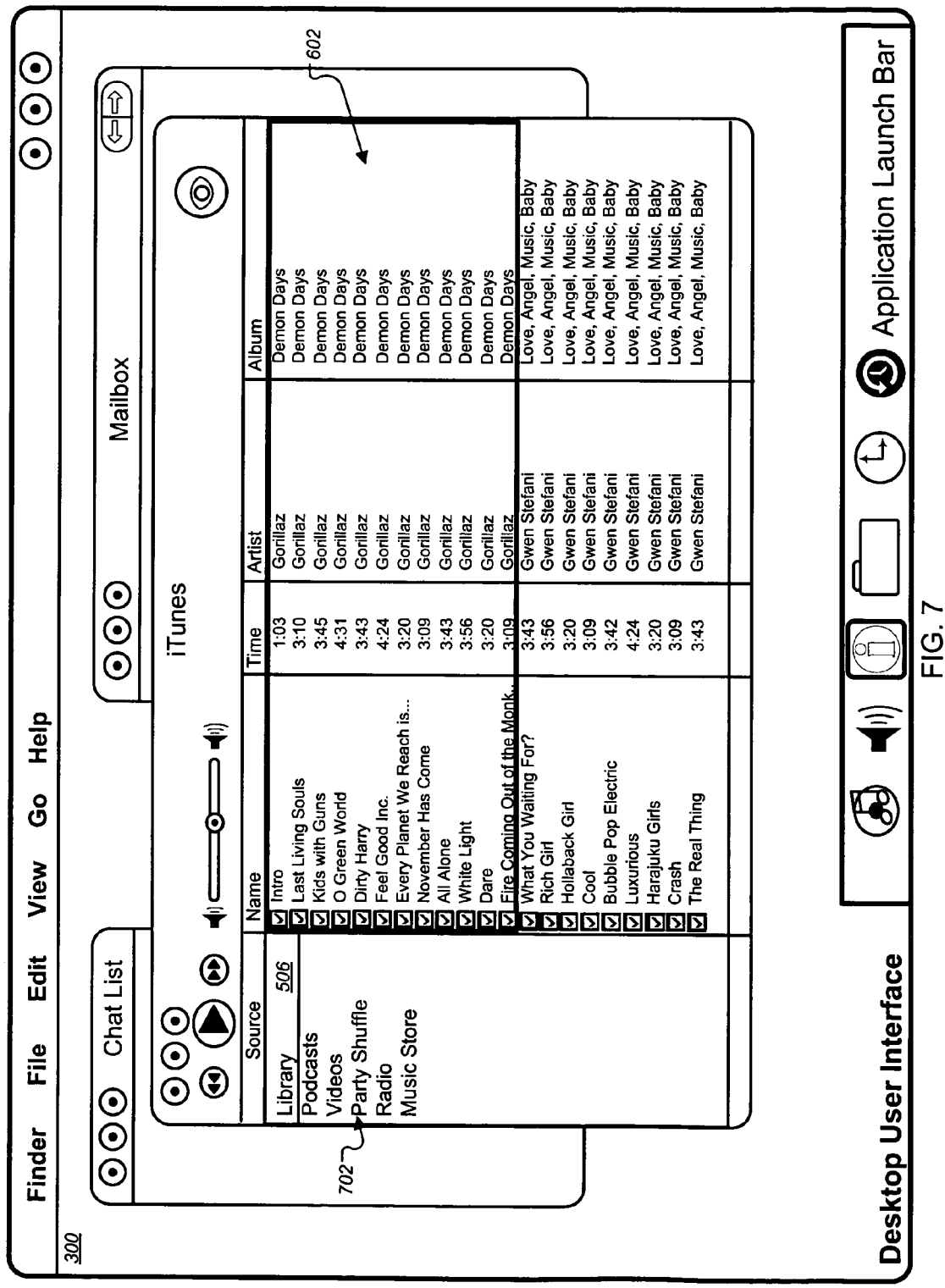
FIG. 7 is a screen shot showing the desktop user interface after some contents from an earlier version have been restored using the time machine engine.

FIG. 7 is a screen shot showing the user interface 300 after some contents from an earlier version have been restored using the time machine engine. As shown, the iTunes™ library 506 now includes the restored twelve songs. In this example, actual data content represented by one snapshot was collected and restored in the iTunes™ application. Alternatively, the time machine application can restore only the organization of the data. For example, in iTunes™, the user can have a number of different playlists, such as the "Party Shuffle" playlist 702. Each playlist can contain a different set of songs. In general, songs which appear in more than one playlist do not correspond to multiple copies of the song because the playlist is considered a particular organization of songs in the source library 506. Therefore, if the user restores a playlist using the time machine application, only the playlist organization can require restoration. Thus, the underlying songs do not require restoration in such an example, unless they are missing from the source library 506. These and other types of non-file form data (e.g., metadata or other application data) can be restored using the time machine engine.

Figure 8:
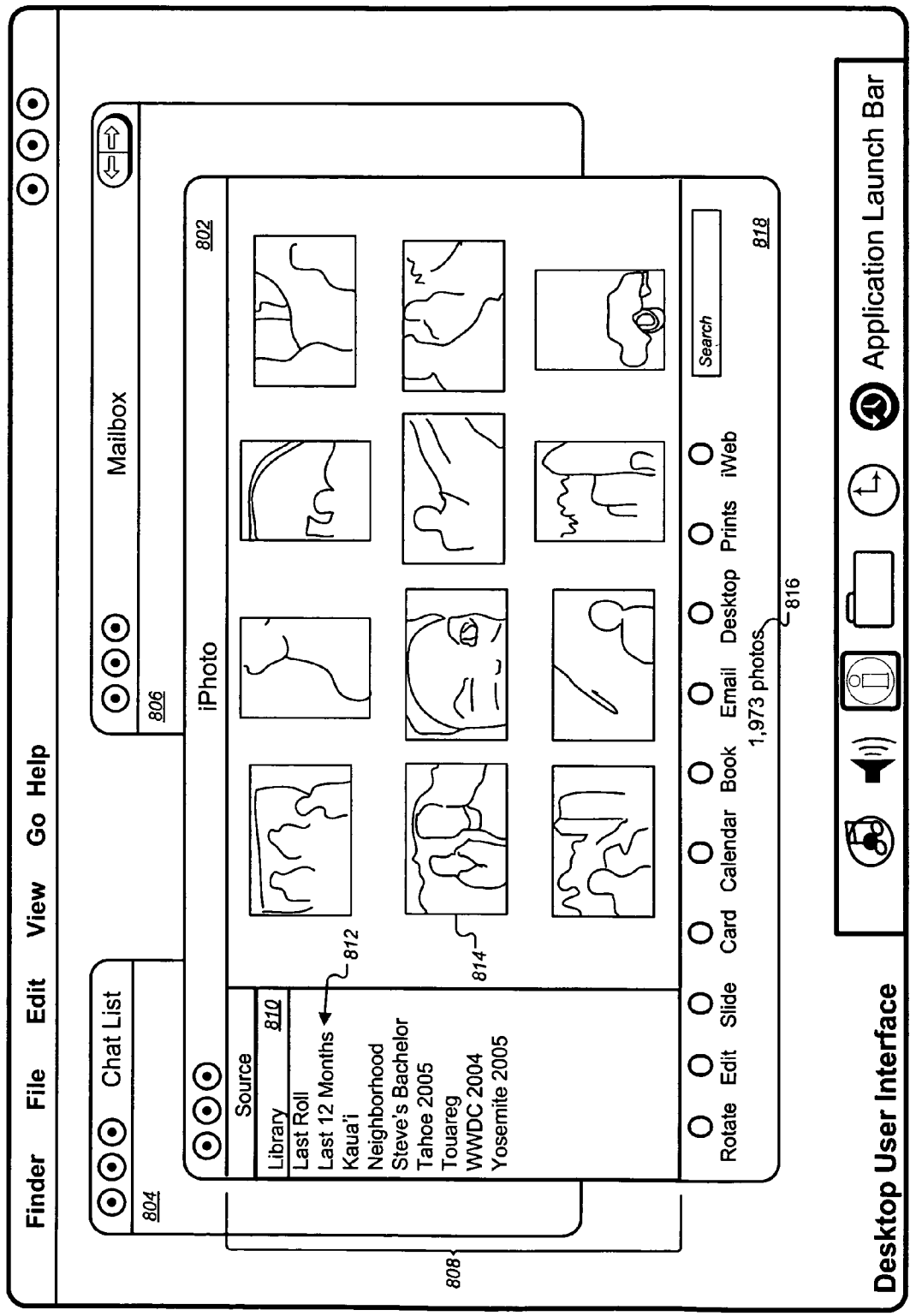
FIG. 8 is a screen shot depicting an example of a desktop user interface with multiple open applications.

FIG. 8 is a screen shot depicting an example of a desktop user interface with multiple open applications. A user has launched an iPhoto™ application window 802, (available from Apple Computer in Cupertino, Calif.) which is currently presented in the foreground, and a chat application 804 and a mail application 806 that are presented in the background. In particular, the iPhoto™ application is here displaying contents of the user's library, which lists the user's photo albums containing photographs. The iPhoto™ application can be used for accessing, storing, and organizing media, such as images, scanned photographs, and video content. While working with the applications, or at some other time, a user can initiate a time machine session in the system.

As shown in FIG. 8, there is a source pane 808 in the application window 802 for navigating the content. For example, the user can select a particular photo album to view the contents in the photo album (e.g. photographs, images, and video content). In this example, the user has selected a "Library" item 810, and the iPhoto™ application has presented to the user all of the images in the library 810. In some implementations, the user can select one or more albums to display the contents of each such album in the iPhoto™ application. For example, the user can select a "Last 12 Months" photo album 812, and this can display all images collected in the selected album in the application window 102. In some implementations, the contents can be displayed as thumbnail images, such as thumbnail image 814. In other implementations, the contents can be displayed in list form using the file name as the displayed image. The contents in each photo album can be different sets of images, for example, organized by event, theme, time, category, and the like. In some implementations, a photograph count 816 can be presented to the user showing how many images are in the current application window 802. In general, the user can create, delete, or transfer images in the photo albums and the photograph count 816 can adjust accordingly when a photograph is added or deleted from the application window 802, or when the user switches between photo albums. As shown, the photograph count 816 displays "1,973 photos," indicating that there are 1,973 photographs in the current user library 810.

In addition to creating, deleting and transferring images in the photo album, the user can also modify the images by selecting various photograph options shown in a control panel 818. The control panel 818 can include options allowing the user to rotate, edit, email, or generally move the images into other configurations. For example, the control panel 818 can present options to the user to select images from several photo albums to create a book or calendar entry using the selected images. As another example, the panel 818 provides that the user can search for images using the application.

Figure 9:
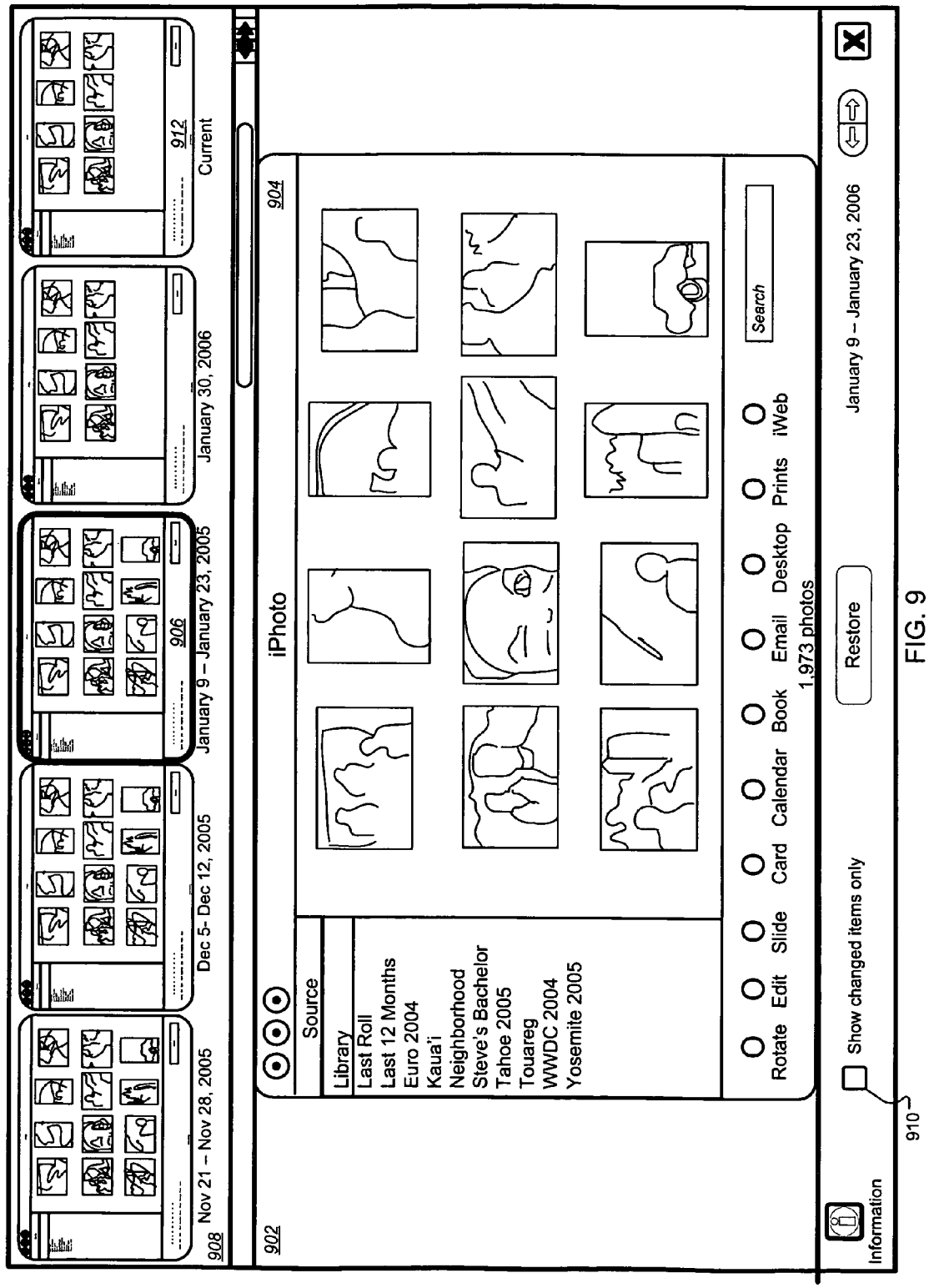
FIG. 9 is a screen shot depicting an example of a state for a time machine user interface after the time machine engine has been activated.

FIG. 9 is a screen shot depicting an example of a state for a time machine user interface 902 after the time machine engine has been activated. The presentation window 904 is displaying a "Jan. 9-Jan. 23, 2005" snapshot 906 of the iPhoto™ application, for example because the user has selected this particular snapshot from the timeline 908. Generally, the time machine in some implementations provides that an exact replica of the selected snapshot can be restored. However, in some implementations, the user can select a "Show changed items only" checkbox 910 to modify the content to be presented in the interface 902. For example, when the checkbox 910 has been selected, the timeline can adjust to display only items with reference to the "Current" snapshot 912. An example of selecting the "Show changed items only" checkbox 910 is described with reference to FIG. 10.

Figure 10:
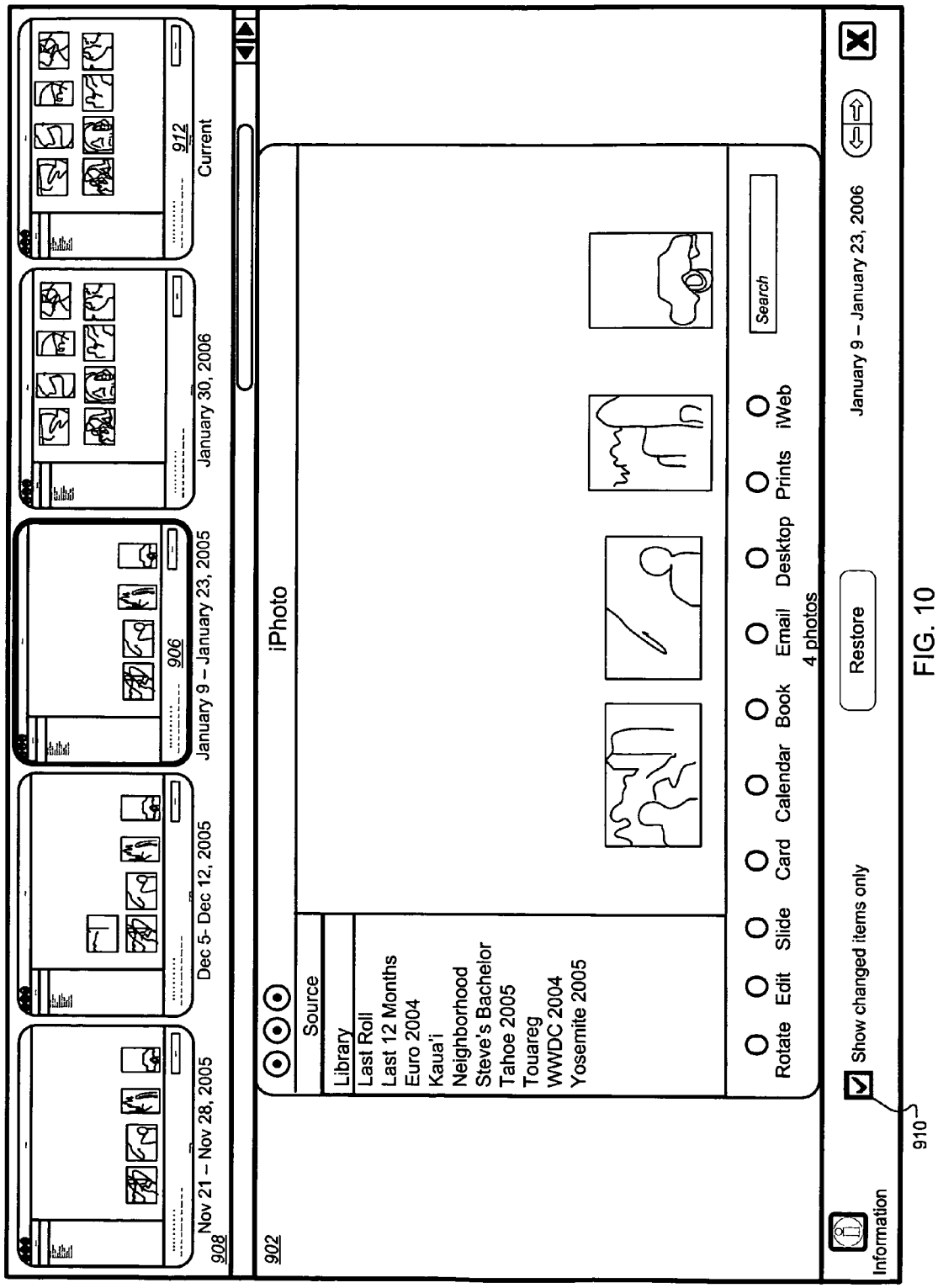
FIG. 10 is a screen shot depicting an example showing changed items in a time machine user interface.

FIG. 10 is a screen shot depicting an example showing changed items in a time machine user interface. In particular, the user has checked the "Show changed items only" checkbox 910 for purposes of restoring only the changed items in the "Current" snapshot 912. When the checkbox 910 is selected, all images that are present in the "Current" snapshot 912 are deleted from the prior snapshots. For example, the "Jan. 9-Jan. 23, 2005" snapshot 906 shows the four photographs that are not present in the "Current" snapshot 912. Thus, when the checkbox 910 is selected, the content of each snapshot is presented relative to the content of the current snapshot. In another implementation, the checkbox 910 can filter out snapshots in the timeline that are identical to the current snapshot, and leave the remaining snapshots intact.

Figure 11:
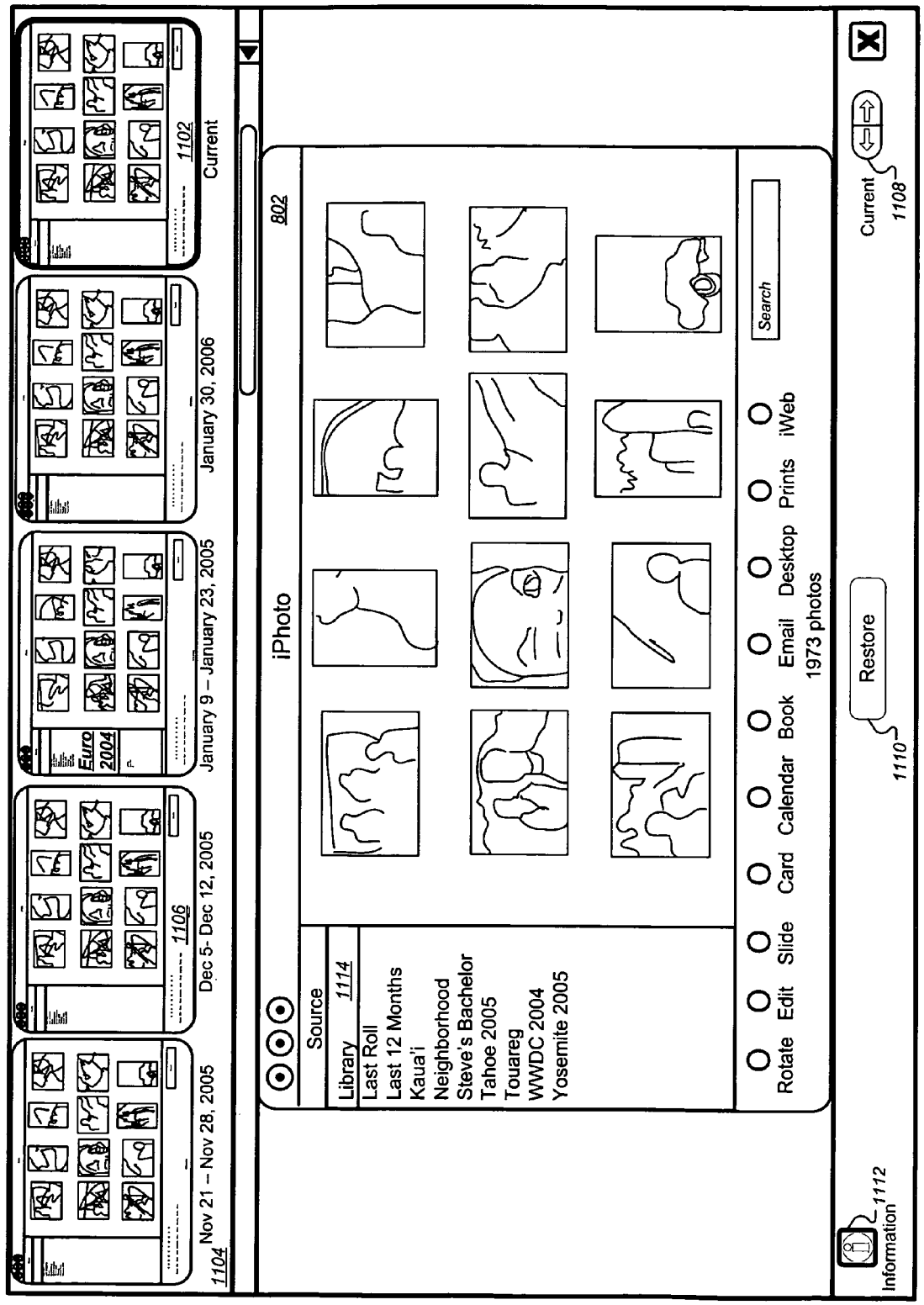
FIG. 11 is a screen shot depicting the time machine interface after the time machine engine has been activated.

FIG. 11 is a screen shot depicting the time machine interface after the time machine engine has been activated. The iPhoto™ application from FIG. 8 corresponding to a current snapshot 1102 is being presented in the presentation window 802. A timeline 1104 contains a set of iPhoto™ snapshots, each of which includes a date indicating when the snapshot was taken. In some implementations, a date range can be displayed indicating that the content in the snapshot is the same throughout the time period, as shown, for example, in snapshot 1106. Navigation 1108, restore 1110 and information 1112 function buttons can operate substantially as described earlier with reference to FIG. 3. The snapshots shown in the timeline 1104 can be images representing the iPhoto™ application showing the state of a source library 1114 for each snapshot. The user can navigate between snapshots with the image shown in the presentation window 802 corresponding to the selected snapshot.

Figure 12:
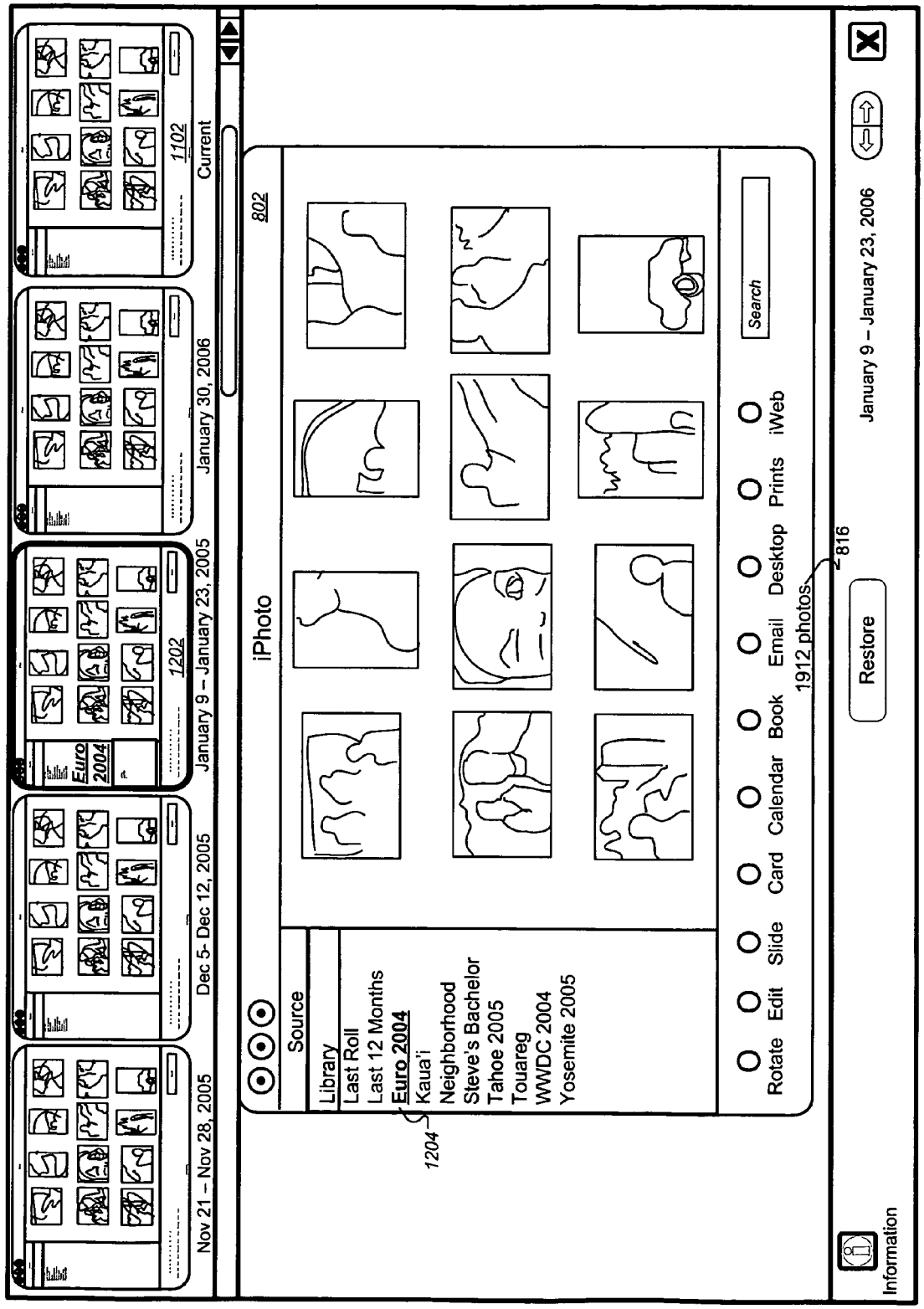
FIG. 12 is a screen shot depicting the time machine interface of FIG. 11 where a snapshot has been selected in the timeline.

FIG. 12 is a screen shot depicting the time machine interface of FIG. 11 where a snapshot 1202 has been selected in the timeline. The iPhoto™ application interface corresponding to the selected snapshot 1202 (Jan. 9-Jan. 23, 2005) is displayed in the presentation window 802. Here, the user can search for a photo album that is not present in the current snapshot 102, such as the "Euro 2004" album. The selected snapshot 1202 includes the Euro 2004 album. Accordingly, the user can navigate to this snapshot to access the content thereof (the Euro 2004 folder) that is not present in the current version. As shown, the number of photographs 816 in the snapshot 1202 is 1,912, whereas the current snapshot 1102 contains 1,973 pictures.

Figure 13:
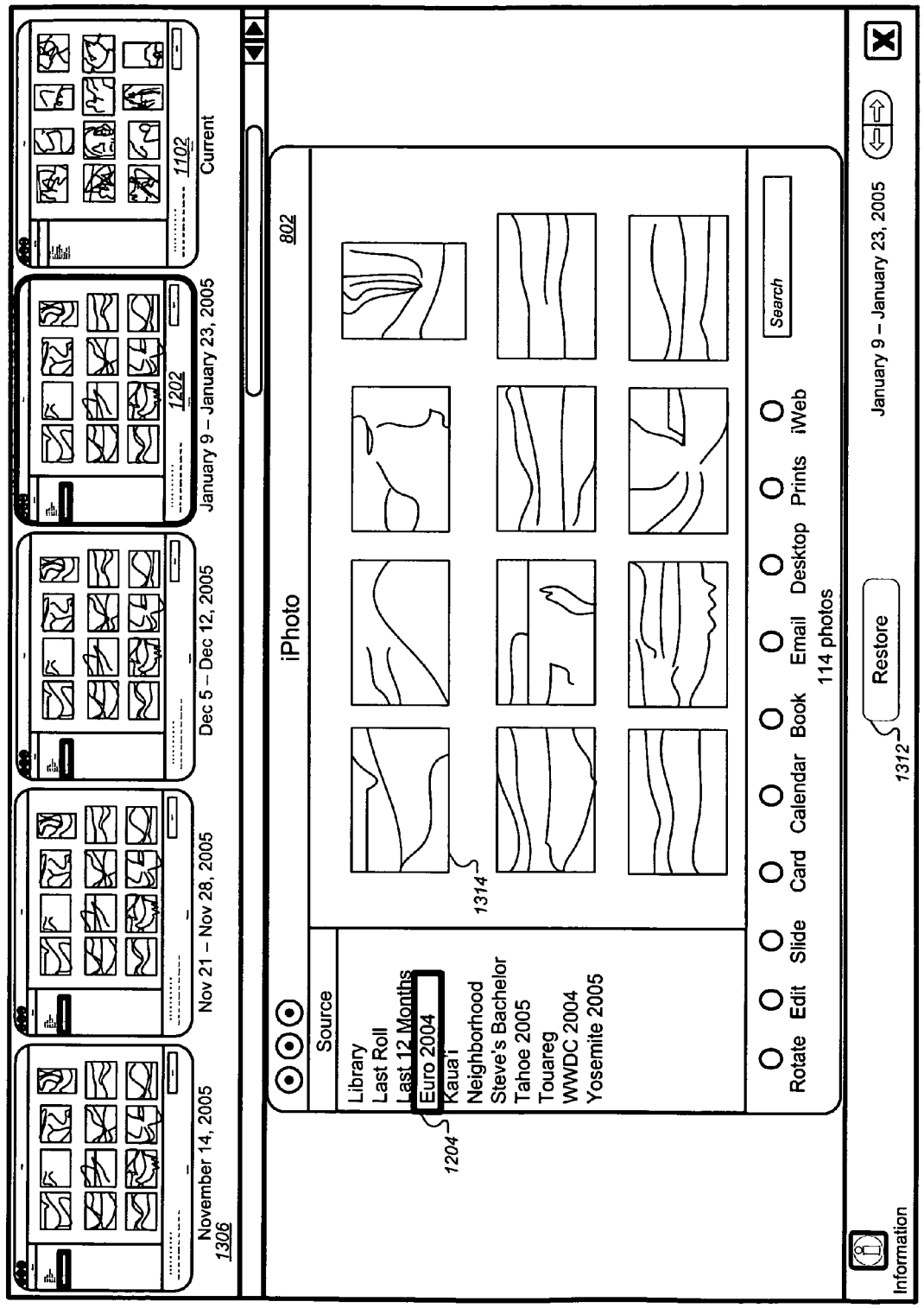
FIG. 13 is a screen shot depicting the time machine interface where contents of a snapshot have been selected.

FIG. 13 is a screen shot depicting the time machine interface where a snapshot 1202 has been selected in the timeline. As shown, the album depicted in the snapshot 1202 is the "Euro 2004" album 1204. Upon the user selecting the snapshot 1202, the user can then select the "Euro 2004" album 1204. This can, in turn, trigger the interface to present the backed up data for the "Euro 2004" album 1204. The user can select a restore button 1312 to restore the content of the "Euro 2004" album along with all other contents in the corresponding earlier version. As another example, the user can choose to restore only a portion of the snapshot 1202 by selecting at least one image in the presentation window 802. For example, to restore only image 1314, the user can select the image and then select the restore button 1312. Selecting the restore button causes the album 1204, or a selected portion thereof, to be restored in the current view of the iPhoto™ application and is thereafter accessible to the user. For example, the album 1204 can be restored to the source library in the iPhoto™ application allowing the user to modify the contents in the album 1204. In some implementations, the restore button caption can change to "Restore 1 image" when a user selects one image.

Figure 14:
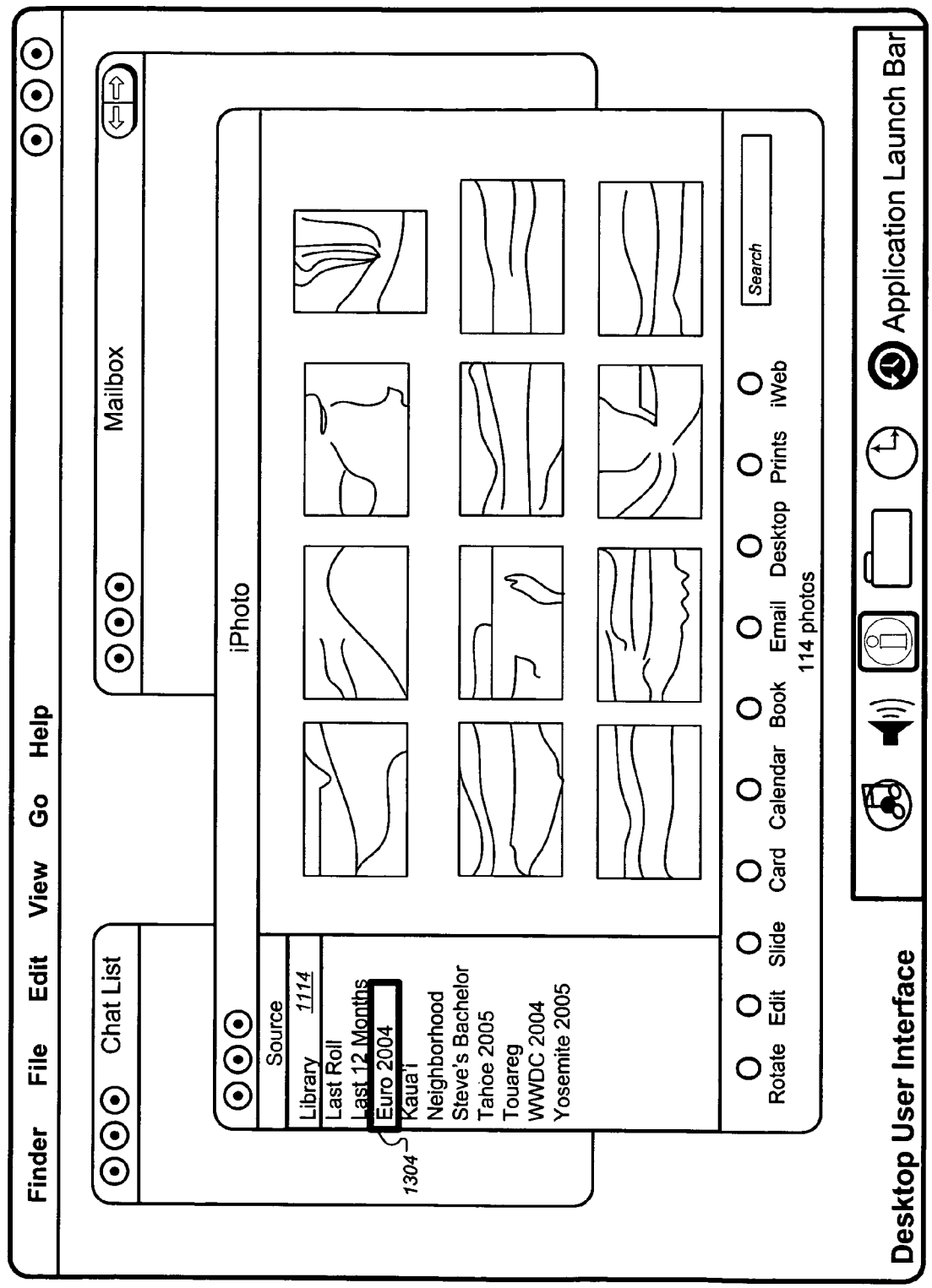
FIG. 14 is a screen shot showing another example of the desktop user interface after some contents from an earlier version have been restored using the time machine engine.

FIG. 14 is a screen shot showing another example of the desktop user interface after some contents from an earlier version have been restored using the time machine application. Particularly, the user here selected the Euro 2004 folder for restoration. As shown, the iPhoto™ library 1114 now includes the restored album "Euro 2004." Both the album and the image content have been restored to the iPhoto™ application. In some implementations, the user can choose to restore only the image content. For example, images can be selected from a backup snapshot and restored in a new album. Alternatively, the selection can be stored in an existing album.

Figure 15:
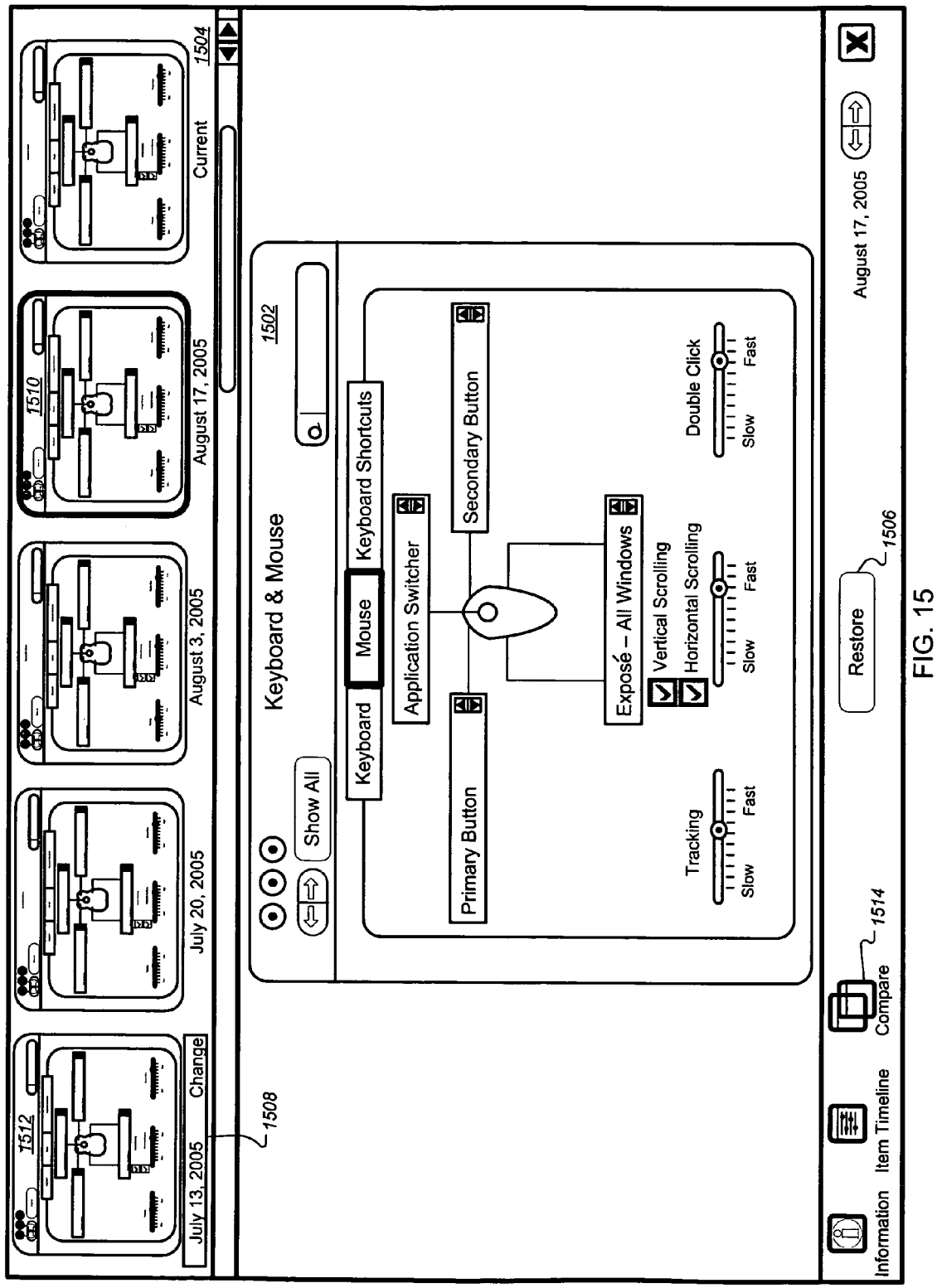
FIG. 15 is a screen shot showing the time machine interface used with a "Keyboard & Mouse" settings pane.

The above examples involve backup versions of music libraries or photo albums. Many different types of applications, items, system settings, preferences, elements or processes can be backed up and made accessible through a time machine. FIG. 15 is a screen shot showing the time machine interface used with a "Keyboard & Mouse" settings pane. This function can be one that is provided as part of the operation system 230 (FIG. 2). Other aspects of the operating system can similarly be subject to time machine operations. For example, preferences associated with other input devices, system settings (e.g., display device preferences, printer preferences), and user interface settings (e.g., preferences defining a look and feel of the user interface such as colors, background images and, screensaver preferences).

In this example, a presentation window 1502 is shown displaying a system settings interface (e.g., a "control panel") for keyboard and mouse settings in a computer system. The user can enter the time machine interface to restore previous system or device settings. Upon entering the time machine interface, a timeline 1504 can show snapshots corresponding to earlier versions of the keyboard and mouse settings. For example, the user may wish to return to a default setting for a mouse. Here, the user can search through the timeline 1504 for a previous setting, such as a default, and select a restore button 1506 to restore the mouse settings to that of the selected snapshot settings. In addition, the timeline 1504 can display a "change" indicator 1508 with the date or filename under the snapshots to indicate a change in a selected snapshot 1510 relative to another snapshot 1512. For example, the snapshot 1512 displays Jul. 13, 2005 and the change indicator 1508 because there are differences between the selected snapshot 1510 and the Jul. 13, 2005 snapshot 1508.

The user can wish to compare settings between two snapshots without initially restoring either of them. Some implementations can include a compare icon 1514 that a user can select to display both snapshots in the presentation window for comparison.

Figure 16:
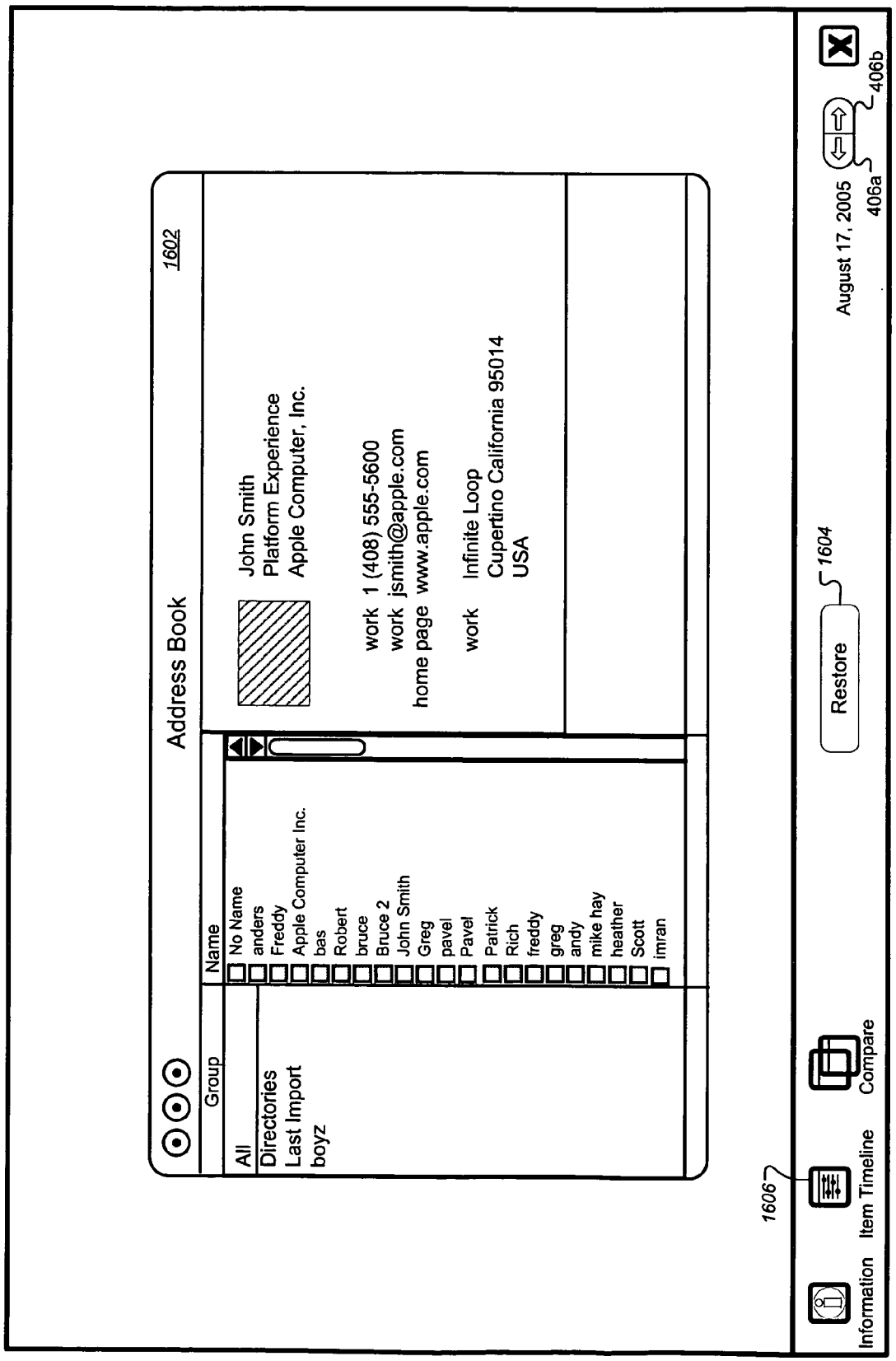
FIG. 16 is a screen shot showing the time machine interface for an address book application.

As another example, FIG. 16 is a screen shot showing a time machine interface for an address book application (which can be a distinct application or part of another application such as an e-mail application). In this example, a presentation window 1602 is showing an address book application. Address book information within the application can be revised over time, and the time machine application can be used to restore, for example, lost or deleted contact information within an address book. In some implementations, the user can restore a directory of contacts by selecting a snapshot that includes at least one directory not present in a current snapshot.

The user can also restore a complete address book by selecting a particular snapshot containing the address book and next selecting a restore button 1604. As shown in FIG. 16, the time machine interface, in this implementation, does not include a timeline for the user to select snapshots from. In some implementations the user can navigate through snapshots using the control buttons 406a and 406b. As another example, the timeline can appear as a rollover effect when a cursor or the pointing device is placed on the corresponding area of the interface. In some implementations, the user can select an item timeline icon 1606 to open a timeline view of snapshots, which can present text information about one or more snapshots and optionally facilitate navigation to any snapshot. In some implementations, the timeline view can be toggled off and on using the item timeline icon 1606.

The time machine interface can also be used to present backup information relating to an e-mail application. For example, the user can enter the time machine interface to restore any or all contents or data associated with the e-mail application, such as data associated with an inbox folder, a sent items folder, a deleted items folder, an address book, calendar, preferences, or any other data of the e-mail application. For example, in one implementation, the user can restore inbox messages that were permanently deleted from the e-mail application. The user can enter the time machine interface and select a snapshot that includes the deleted inbox messages. In one implementation, the user can restore the entire inbox from that snapshot. Alternatively, the user can select only particular inbox messages to restore using the time machine interface. Similarly, the user can restore deleted message from other folders as well as contact information that was deleted.

In another implementation, the time machine interface can be used to present backup information associated with a messaging application. For example, the user can enter the time machine interface to restore one or more deleted friends from a "buddy list", deleted conversations, preferences, and the like.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing data including electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   receiving, while a current view of an application's user interface is displayed in an application window, a first user input requesting that a history view of the application's user interface be displayed;
   displaying the history view of the application's user interface in a presentation window distinct from the application window in response to the first user input, the history view including at least a visual representation of a first snapshot of a past user interface of the application, where the visual representation of the first snapshot represents the application's user interface as the user interface appeared at a time in the past and includes visual representations of elements of the user interface from the time in the past, and where the visual representation includes a visual representation of a first element;
   receiving, while the visual representation is displayed, a second user input requesting that the current view of the application's user interface be modified according to the visual representation, at least with regard to the first element; and
   modifying, in response to the second user input, the current view of the application's user interface according to the visual representation, at least with regard to the first element.

2. The method of claim 1, where the first user input requesting the history view is initiated in the current view of the application's user interface.

3. The method of claim 1, where the second user input requests that the modification be limited to the first element, and wherein the modification modifies the current view of the application's user interface to include the first element and does not otherwise modify the current view of the application's user interface.

4. The method of claim 1, where the first element is a particular set of application data that is not stored as typical file data.

5. The method of claim 4, where the set of application data includes mail messages.

6. The method of claim 4, where the set of application data includes address book entries.

7. The method of claim 4, where the set of application data includes audio data.

8. The method of claim 1, where the visual representation is included in a timeline presented in the history view, the timeline including several representations of user interfaces corresponding to past states of the application.

9. The method of claim 8, where underlying data for the representations of the user interfaces corresponding to past states of the application were obtained at times defined by a schedule.

10. The method of claim 8, where underlying data for the representations of the user interfaces corresponding to past states of the application were obtained at times defined by a rule.

11. The method of claim 8, where underlying data for the representations of the user interfaces corresponding to past states of the application were obtained at times when at least one predefined event occurred.

12. The method of claim 8, where the presentation window further includes an input control for modifying the timeline to include only at least one of the representations whose corresponding past state differs from a current state of the application.

13. The method of claim 8, where the presentation window includes a rollover function where the timeline is displayed when a user-controlled cursor is located over the timeline, and the timeline is not displayed when the user-controlled cursor is not located over the timeline.

14. The method of claim 1, where the application is an audio application and the first element is a playlist.

15. The method of claim 1, where the application is an e-mail application and the first element is an inbox.

16. The method of claim 1, where the application is an e-mail application and the first element is a calendar.

17. The method of claim 1, where the application is an address book application and the first element is a directory of contacts.

18. The method of claim 1, where the application is a messaging application and the first element is a buddy list.

19. The method of claim 1, where the application is not an application used primarily for viewing and restoring backup data.

20. The method of claim 1, where modifying the current view of the application includes restoring data associated with the first element.

21. A computer program product, encoded on a machine-readable storage device or a machine-readable storage substrate, operable to cause data processing apparatus to perform operations comprising:
receiving, while a current view of an application's user interface is displayed in an application window, a first user input requesting that a history view of the application's user interface be displayed;
displaying the history view of the application's user interface in a presentation window distinct from the application window in response to the first user input, the history view including at least a visual representation of a first snapshot of a past user interface of the application, where the visual representation of the first snapshot represents the application's user interface as the user interface appeared at a time in the past and includes visual representations of elements of the user interface from the time in the past, and where the visual representation includes a visual representation of a first element;
receiving, while the visual representation is displayed, a second user input requesting that the current view of the application's user interface be modified according to the visual representation, at least with regard to the first element; and
modifying, in response to the second user input, the current view of the application's user interface according to the visual representation, at least with regard to the first element.

22. The computer program product of claim 21, where the application is not an application used primarily for viewing and restoring backup data.

23. A computer program product encoded on a machine-readable storage device or a machine-readable storage substrate, the computer program product including instructions that, when executed, generate on a display device a user interface comprising:
a view display area for presenting a current view of an application's user interface in an application window;
a history view display area for presenting a history view of the application's user interface in a presentation window distinct from the application window, the history view including at least a visual representation of a first snapshot of a past user interface of the application, where the visual representation represents the application's user interface as the user interface appeared at a time in the past and includes visual representations of elements of the user interface from the time in the past; and
an input control for initiating a modification of the current view of the application's user interface according to at least a portion of the visual representation.

24. The computer program product of claim 23, where the visual representation includes at least a visual representation of a first element that a user can select, and wherein initiation of the input control after the selection initiates the modification of the current view of the application according to only the first element of the visual representation.

25. The computer program product of claim 23, where the application is not an application used primarily for viewing and restoring backup data.

26. The computer program product of claim 23, where the visual representation is included in a timeline presented in the history view, the timeline including several representations of user interfaces corresponding to past states of the application.

27. The computer program product of claim 26, where the presentation window further includes another input control for modifying the timeline to include only at least one of the representations whose corresponding past state differs from a current state of the application.

28. The computer program product of claim 23, where the application is not an application used primarily for viewing and resotring backup data.

29. A method comprising:
defining one or more criteria for capturing a state of a view of a user interface of an application;
capturing the state of the view in accordance with the criteria;
receiving a prompt to suspend presentation of a current view of the user interface and present a visual representation of the captured state of the view in a presentation window distinct from the user interface, where the visual representation represents the user interface as the user interface appeared at a time in the past; and
reinstating the visual representation into the current view of the user interface.

30. The method of claim 29, where defining the one or more criteria includes receiving a user input in the user interface of the application setting one or more parameters associated with the one or more criteria.

31. The method of claim 29, where the application is not an application used primarily for viewing and restoring backup data.

32. The method of claim 29, where reinstating the representation into the current view of the user interface includes restoring data associated with the representation.

33. A computer program product, encoded on a machine-readable storage device or a machine-readable storage substrate, operable to cause data processing apparatus to perform operations comprising:
defining one or more criteria for capturing a state of a view of a user interface of an application;
capturing the state of the view in accordance with the criteria;
receiving a prompt to suspend presentation of a current view of the user interface and present a visual representation of the captured state of the view in a presentation window distinct from the user interface, where the visual representation represents the user interface as the user interface appeared at a time in the past; and
reinstating the representation into the current view of the user interface.

34. The computer program product of claim 33, where the application is not an application used primarily for viewing and restoring backup data.

35. A method comprising:
receiving, while a current view of a system settings interface is displayed in a user interface, a first user input requesting that a history view of the system settings interface be displayed;
displaying the history view of the system settings interface in a presentation window distinct from the user interface in response to the first user input, the history view including at least a first representation of a past view of the system settings interface, where the first representation corresponds to a past state of the system settings interface and represents the systems settings interface as the systems settings interface appeared at a time in the past, the past state including one or more preferences;
receiving, while the first representation is displayed, a second user input requesting that the current view of the system settings interface be modified according to the first representation, at least with regard to a first preference of the one or more preferences; and
modifying, in response to the second user input, the current view of the system settings interface according to the first representation, at least with regard to the first preference.

36. The method of claim 35, where the system settings interface is an input device settings interface and the one or more preferences are keyboard and mouse settings.

37. The method of claim 35, where the system settings interface is a user interface settings interface and the one or more preferences are user interface preferences.

38. A method comprising:
receiving, while a current view of an application's user interface is displayed on a device, a first user input requesting that a previously archived view of the application's user interface be displayed;
displaying the previously archived view of the application in a presentation window distinct from the current view of the application's user interface, where the previously archived view includes a first view of an application interface as the application interface appeared at a time in the past, where the first view of the application interface corresponds to a past state of the application;
receiving, while the first view is displayed, a second user input; and
displaying, in response to the second user input, a second view of the application interface as the application interface appeared at a time in the past, where the second view of the application interface corresponds to the past state of the application and reflects an update to the first view based on the second user input.

39. A method comprising:
receiving, while a current view of an application's user interface is displayed in an application window, a first user input requesting that a history view of the application's user interface be displayed;
displaying the history view of the application's user interface in a presentation window distinct from the application window in response to the first user input, the history view including at least a first representation of a past user interface of the application, where the first representation represents the application's user interface as the user interface appeared at a time in the past and includes visual representations of elements of the user interface from the time in the past, and where the first representation includes a visual representation of a first element;
receiving, while the first representation is displayed, a second user input requesting that the current view of the application's user interface be modified according to the first representation, at least with regard to the first element; and
modifying, in response to the second user input, the current view of the application's user interface according to the first representation, at least with regard to the first element.

* * * * *

UNITED STATES PATENT AND TRADEMARK OFFICE
CERTIFICATE OF CORRECTION

PATENT NO. : 7,860,839 B2  
APPLICATION NO. : 11/499250  
DATED : December 28, 2010  
INVENTOR(S) : Pavel Cisler et al.

It is certified that error appears in the above-identified patent and that said Letters Patent is hereby corrected as shown below:

On Title page 2, item (56) in column 1, under "U.S. Patent Documents", line 13, below "6,188,405 B1 2/2001 Czerwinski et al." delete "0,047,368 A1 11/2001 Oshinsky et al.".

On Title page 2, item (56) in column 1, under "U.S. Patent Documents", line 44, below "7,676,689 B1 3/2010 Shioyama et al." insert -- 2001/0047368 11/2001 Oshinsky et al. --.

In column 11, line 63, delete "102," and insert -- 1102, --, therefor.

In column 18, line 22-24, in claim 28, delete "The computer program product of claim 23, where the application is not an application used primarily for viewing and resotring backup data." and insert -- The computer program product of claim 24, where modification of the current view includes a restoration of the first element of the first representation into the current view. --, therefor.

Signed and Sealed this  
Twenty-fifth Day of October, 2011

David J. Kappos  
*Director of the United States Patent and Trademark Office*